(12) United States Patent
Taguchi

(10) Patent No.: US 8,042,888 B2
(45) Date of Patent: Oct. 25, 2011

(54) WHEEL POSITION IDENTIFYING APPARATUS FOR VEHICLE

(75) Inventor: Takeyasu Taguchi, Nagoya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1075 days.

(21) Appl. No.: 11/855,667

(22) Filed: Sep. 14, 2007

(65) Prior Publication Data
US 2008/0067867 A1    Mar. 20, 2008

(30) Foreign Application Priority Data
Sep. 15, 2006    (JP) .................................. 2006-251455

(51) Int. Cl.
B60T 8/66    (2006.01)
B60C 23/00    (2006.01)
(52) U.S. Cl. .......................... 303/167; 340/444; 340/447
(58) Field of Classification Search .................. 303/138, 303/168; 73/146; 701/1, 2, 129; 340/438–447
See application file for complete search history.

(56) References Cited

U.S. PATENT DOCUMENTS

| 6,672,685 | B2 | 1/2004 | Ishimura et al. | |
|---|---|---|---|---|
| 7,032,441 | B2 * | 4/2006 | Kanatani et al. | 73/146 |
| 2005/0134445 | A1 * | 6/2005 | Ogawa et al. | 340/447 |
| 2006/0111853 | A1 * | 5/2006 | Ogawa | 702/35 |
| 2006/0176164 | A1 * | 8/2006 | Osumi et al. | 340/444 |
| 2006/0195233 | A1 * | 8/2006 | Ogawa et al. | 701/2 |

FOREIGN PATENT DOCUMENTS

| FR | 2 714 643 A1 | 7/1995 |
|---|---|---|
| JP | 2002-293229 A | 10/2002 |
| JP | 2004-331011 A | 11/2004 |

OTHER PUBLICATIONS

Official Action issued by the German Patent Office on Jan. 18, 2011, with English language translation, in corresponding German Patent Application No. 10 2007 000 732.0-21.

* cited by examiner

*Primary Examiner* — Christopher Schwartz
(74) *Attorney, Agent, or Firm* — Buchanan Ingersoll & Rooney PC

(57) ABSTRACT

A wheel position identification apparatus includes: braking force fluctuation generating means controlling the braking force-applying means to generate a braking force fluctuation of the wheel independently. The apparatus further includes response probability obtaining means for obtaining a presence, or an absence, of a response of the wheel relative to the braking force fluctuation based upon a wheel rotational speed fluctuation of the wheel. The wheel rotational speed fluctuation is obtained from a rotation state sensor mounted on each wheel. The apparatus still further includes associating means for associating the wheel with the braking force-applying means respectively. The association is based upon a combination of a presence, or an absence, of the braking force fluctuation at each braking force-applying means and the presence, or the absence, of the response obtained by the response probability obtaining means.

11 Claims, 19 Drawing Sheets

WHEEL POSITION IDENTIFYING APPARATUS FOR VEHICLE

CROSS REFERENCE TO RELATED APPLICATIONS

This application is based on and claims priority under 35 U.S.C. §119 to Japanese Patent Application 2006-251455, filed on Sep. 15, 2006, the entire content of which is incorporated herein by reference.

FIELD OF THE INVENTION

The present invention relates to a wheel position identifying apparatus.

BACKGROUND

JP2004-331011A discloses therein a wheel position identifying apparatus for a vehicle. The wheel position identifying apparatus includes acceleration sensors and wheel speed sensors. The acceleration sensors are arranged at locations for front-left, front-right, rear-left and rear-right tires, respectively. The wheel speed sensors are mounted on the vehicle body corresponding to the locations for the front-left, the front-right, the rear-left and the rear-right tires, respectively. Each acceleration sensor acts as a rotation state sensor and is referred to as a rotation state sensor hereinbelow. The wheel position identifying apparatus compares accelerations a1[$i$]-a5[$i$], which are detected by the acceleration sensors in the tires, with accelerations C1-C4 calculated based upon wheel speeds detected at the vehicle body side. A tire, which is associated with the wheel speed sensor at the vehicle body side, is specified based upon the acceleration level correlated between the tire side and the vehicle body side. Therefore, even when the tires are rotated, i.e., even when the positions of the tires are changed, a computer can identify the position of a particular sensor sending a particular signal. A conventionally known sensor may be applicable as the wheel speed sensor at the vehicle body side, for example a known sensor which is structured with a magnetic sensor in conjunction with a toothed rotor.

The aforementioned wheel speed sensor, which each is mounted at the vehicle body side, is structured such that noise affects precision in detecting a wheel speed while the vehicle is running at a low speed. Therefore, comparison of two types of accelerations and deriving of a correlation therebetween are time-consuming.

A need thus exists for a wheel position identifying apparatus for a vehicle, which identify positions of wheels in a short period of time and with reliability by use of a detection result of a rotation state sensor at a tire side (wheel side) and not by use of a detection result of a wheel speed sensor at a vehicle body side.

SUMMARY OF THE INVENTION

According to an aspect of the present invention: a wheel position identifying apparatus for a vehicle is equipped with a plurality of braking force-applying means fixed at a body of the vehicle and respectively and in advance associated with wheel positions of wheels to be mounted on the vehicle. The apparatus identifies the wheel position of each wheel mounted on the vehicle. The apparatus includes: braking force fluctuation generating means for controlling at least one of the braking force-applying means to generate a braking force fluctuation to at least one of the wheels independently. The apparatus further includes response probability obtaining means for obtaining a presence, or an absence, of a response of the at least one of the wheels relative to the braking force fluctuation based upon a wheel rotational speed fluctuation of the at least one of the wheels. The wheel rotational speed fluctuation is obtained from a rotation state sensor mounted on each wheel. The apparatus still further includes associating means for associating the at least one of the wheels with the at least one of the braking force-applying means respectively. The association is based upon a combination of a presence, or an absence, of the braking force fluctuation at each braking force-applying means and the presence, or the absence, of the response obtained by the response probability obtaining means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment will be described below with reference to the attached drawings.

Figure 1:
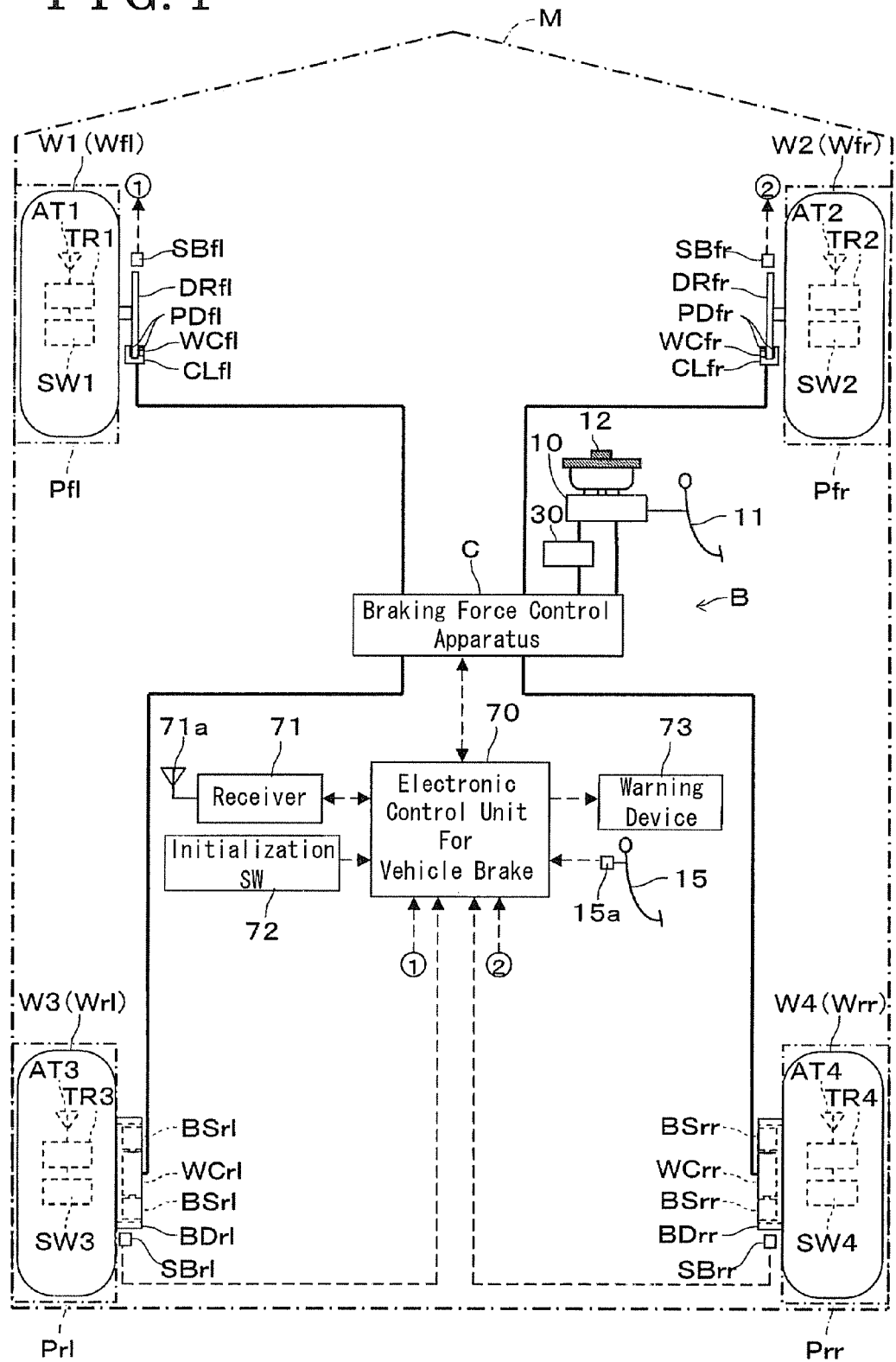
FIG. 1 is a view schematically illustrating a vehicle applied with a wheel position identifying apparatus according to an embodiment of the present invention.
Figure 2:
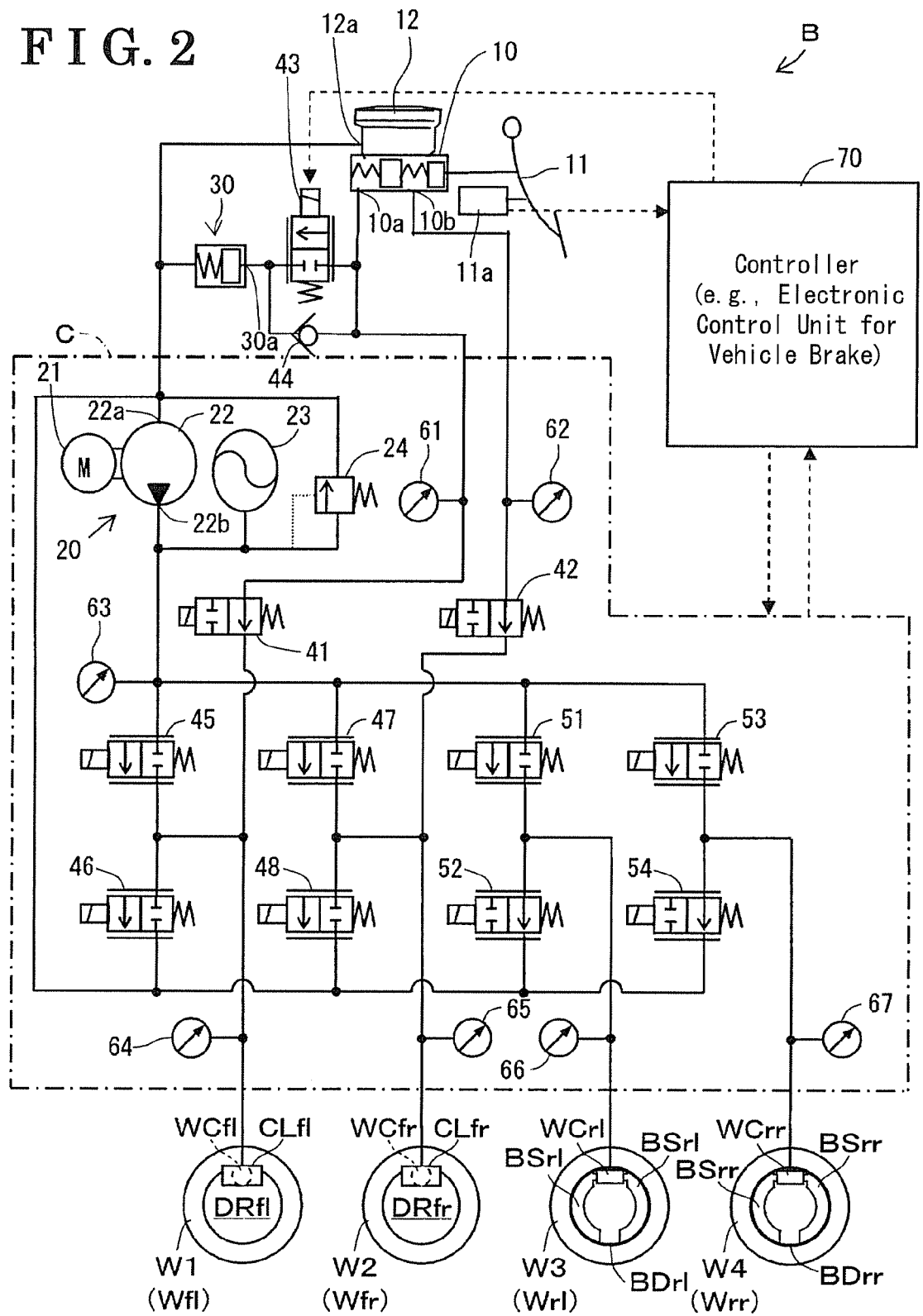
FIG. 2 is a view schematically illustrating a braking force control apparatus illustrated in FIG. 1.
Figure 3:
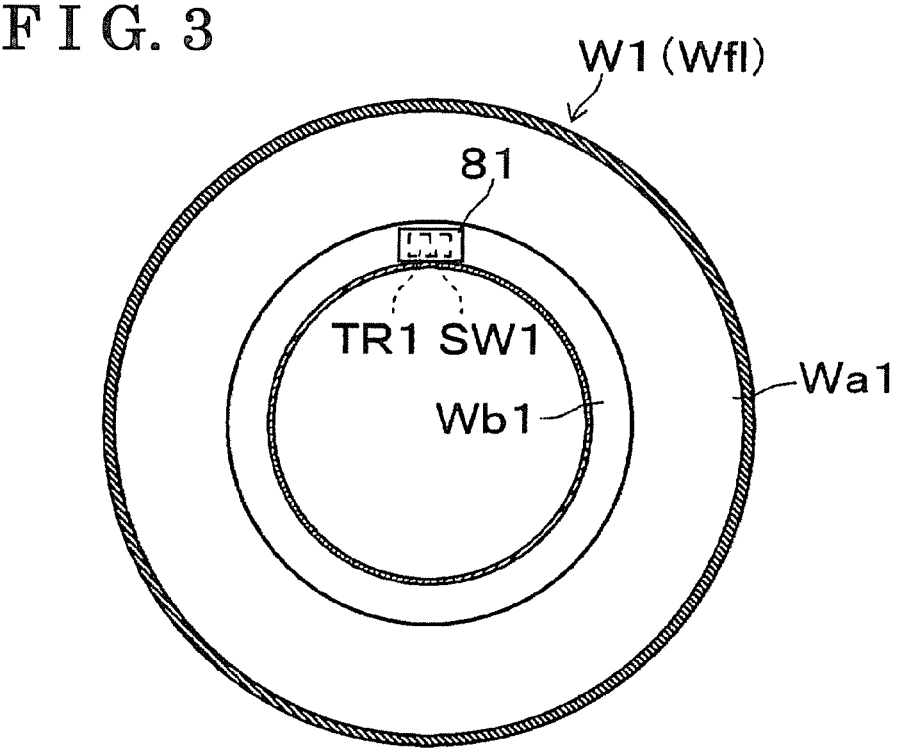
FIG. 3 is a sectional view schematically illustrating a wheel in FIG. 2.

An embodiment of a vehicle, on which a wheel position identifying apparatus according to the present invention is mounted, is described below with reference to the attached drawing figures. FIG. 1 is an outline view illustrating a structure of a vehicle, FIG. 2 is a view illustrating a structure of a braking force control apparatus for the vehicle, and FIG. 3 is a sectional view schematically illustrating a wheel of the vehicle.

Provided on a vehicle M are: first, second, third and fourth wheels W1, W2, W3 and W4; rotation state sensors SW1, SW2, SW3 and SW4 mounted on the corresponding wheels W1, W2, W3 and W4; wheel cylinders WCfl, WCfr, WCrl and WCrr in advance associated with wheel positions Pfl, Pfr, Prl and Prr; and a hydraulic brake system B. The hydraulic brake system B is configured to brake the vehicle M, i.e., to slow down the running speed of the vehicle M or to stop the vehicle M, by applying oil pressure to each wheel cylinder WCfl, WCfr, WCrl and WCrr and by applying braking force to each corresponding wheel W1, W2, W3 and W4. Each wheel cylinder WCfl, WCfr, WCrl and WCrr serves as braking force-applying means.

The wheels W1, W2, W3 and W4 are detachably arranged at the wheel positions Pfl, Pfr, Prl and Prr of the vehicle M, respectively. According to the embodiment, the vehicle M is provided with four wheels. The wheel positions Pfl, Pfr, Prl and PIT represent front-left, front-right, rear-left and rear-right positions on the vehicle M, respectively. As illustrated in FIG. 3, the wheel W1 includes a tire Wa1 and a wheel Wb1. The other wheels W2, W3 and W4 include each component in the same manner as the wheel W1. After identifying the position of each wheel W1, W3, W3 and W4, each wheel may be expressed as wheel WCfl, WCfr, WCrl and WCrr in response to the actual wheel position.

The wheels W1, W2, W3 and W4 respectively include the rotation state sensors SW1, SW2, SW3 and SW4 each detecting a rotation state of the corresponding wheel W1, W2, W3 and W4. According to the embodiment, the vehicle M is provided with four rotation state sensors. A rotation state of the wheel is expressed as a physical quantity, such as an angular speed and an angular acceleration of the rotating wheel, thereby deriving fluctuation in rotational speed of the wheel (hereinafter, referred to as wheel rotational speed fluctuation). According to the embodiment, the rotation state is an angular acceleration of a wheel, and each rotation state sensor SW1, SW2, SW3 and SW4 is an acceleration sensor detecting an angular acceleration of the corresponding wheel. Precision detection of wheel speed sensors SBfl, SBrr, SBrl and SBrr described later suffers deterioration when the vehicle M runs at a low speed. The rotation state sensor described above however detects a rotation state of the wheel with reliability and precision even when a vehicle is running at a low speed.

The wheels W1, W2, W3 and W4 further include transmitters TR1, TR2, TR3 and TR4, each connected to the corresponding rotation state sensors SW1, SW2, SW3, SW4 and to antennas AT1, AT2, AT3 and AT4, respectively. Accordingly, a rotation state detected by the rotation state sensor SW1, SW2, SW3 and SW4 is transmitted from the corresponding transmitter TR1, TR2, TR3 and TR4 to a receiver 71 via the corresponding antenna AT1, AT2, AT3 and AT4. Here, the rotation state is transmitted in the form of a rotation state signal.

As illustrated in FIG. 3, as for the first wheel W1, the first rotation state sensor SW1, the first transmitter TR1, the first antenna AT1 and a driving battery (not illustrated) for the first rotation state sensor SW1 and the first transmitter TR1 are all housed within a package 81. The package 81 is secured to a rim of the wheel Wb1 so as to be arranged inside of the tire Wa1. The package 81 includes a valve for feeding air into the tire Wa1. The valve penetrates through a valve opening formed at the rim of the wheel Wb1. The other wheels W2, W3 and W4 each include a package structured in the same manner as the package 81.

Each wheel cylinder WCfl, WCfr, WCrl and WCrr is secured to a body of the vehicle M corresponding to each corresponding wheel position Pfl, Pfr, Prl and Prr and restrains a rotational speed of the corresponding wheel Wfl, Wfr, Wrl and Wrr mounted at the wheel position Pfl, Pfr, Prl and Prr. According to the embodiment, the vehicle M includes four wheel-cylinders.

The front-left wheel Wfl and front-right wheel Wfr each include a disc brake. The rear-left wheel Wrl and rear-right wheel Wrr each include a drum brake. Taking the front-left wheel Wfl as an example, the disc brake is assembled with a disc rotor DRfl, which rotates integrally with the wheel Wb1 of the wheel Wfl (W1), the wheel cylinder WCfl, which is attached to a caliper CLfl secured to the vehicle body side and houses therein a piston (not illustrated) slidable in a fluid-tight manner, and a pair of pads PDfl, PDfl, which is arranged in the vicinity of both sides of the disc rotor DRfl and is pushed by the piston. When a base hydraulic pressure or a controlled hydraulic pressure is supplied to the wheel cylinder WCfl, the pair of pads PDfl, PDfl are pushed by the piston and presses the disc rotor DRfl from both sides. Rotation of the wheel Wfl is hence restrained by frictional force generated at a time of pressing the disc rotor DRfl. The front-right wheel Wfr is structured in the same manner.

Taking the rear-left wheel Wrl as an example, the drum brake is assembled with a brake drum BDrl, which rotates integrally with a wheel (not illustrated) of the wheel Wrl, the wheel cylinder WCrl, which is attached to a back plate (not illustrated) secured to the vehicle body side and houses therein a piston slidable in a fluid-tight manner, and a pair of brake shoes BSrl, BSrl, which extend along an inner peripheral surface of the brake drum BDrl and are placed at facing positions. When a base hydraulic pressure or a controlled hydraulic pressure is supplied to the wheel cylinder WCrl, the pair of brake shoes BSrl, BSrl is expanded by the piston and pushes the brake drum BDrl from an inside. Rotation of the wheel Wrl is hence restrained by frictional force generated at a time of pushing the brake drum BDrl from an inside. The rear-right wheel Wrr is structured in the same manner.

The hydraulic brake system B brakes the vehicle M by applying hydraulic pressure to each wheel cylinder WCfl, WCfr, WCrl and WCrr and applying braking force to the corresponding wheel W1, W2, W3 and W4. The hydraulic brake system B incorporates therein a master cylinder 10, a reservoir tank 12, the wheel speed sensors SBfl, SBfr, SBrl, SBrr, a brake actuator C, and a controller 70. The master cylinder 10 generates hydraulic brake fluid (base hydraulic pressure) in response to an operation state of a brake pedal 11 and supplies the hydraulic brake pressure to the wheel cylinders WCfl, WCfr, WCrl and WCrr. The reservoir tank 12 stores brake fluid and supplements the brake fluid into the master cylinder 10. The wheel speed sensors SBfl, SBfr, SBrl and SBrr detect wheel speeds of the wheels Wfl, Wfr, Wrl and Wrr, respectively. The brake actuator C is adapted to supply controlled hydraulic pressure to the respective wheel cylinders WCfl, WCfr, WCrl and WCrr independently of an operation state of the brake pedal 11, i.e., independently of a base hydraulic pressure. The brake actuator C serves as a braking force control apparatus. The controller 70 is adapted to implement a normal brake control by driving the brake actuator C and to identify wheel positions. The controller 70 serves as a wheel position identifying apparatus.

The brake actuator C serves as a braking force control apparatus that independently controls the oil pressure applied to each wheel cylinder WCfl, WCfr, WCrl and WCrr. As illustrated in FIG. 2, the brake actuator C incorporates therein a hydraulic pressure supply source 20, which is provided separately from the master cylinder 10 and applies oil pressure (fluid pressure) to each wheel cylinder WCfl, WCfr, WCrl and WCrr, solenoid valves 41, 42, 45-48, 51-54, and oil pressure gauges 61-67.

The master cylinder 10 is provided with first and second outlet ports 10a, 10b from which brake fluid (fluid) at the same oil pressure level (fluid pressure) is pressured out in response to an operation state of the brake pedal 11. The first outlet port 10a fluidly communicates with the wheel cylinder WCfl for the front-left wheel Wfl via the solenoid valve 41 in a situation where the solenoid valve 41 is in an electrically de-energized mode, as illustrated in FIG. 2. The second outlet port 10b fluidly communicates with the wheel cylinder WCfr for the front-right wheel Wfr via the solenoid valve 42 in a situation where the solenoid valve 42 is in an electrically de-energized mode, as illustrated in FIG. 2.

The solenoid valves 41 and 42 are electrically energized/de-energized to be closed/opened so that a communication from the master cylinder 10 to each wheel cylinder WCfl, WCfr is established or discontinued. More specifically, on occasions where the brake pedal 11 is depressed or treaded when the hydraulic pressure supply source 20 is in a normal mode, the solenoid valves 41, 42 are electrically energized to be closed so that the communication between the master cylinder 10 and each wheel cylinder WCfl, WCfr is discontinued. Meanwhile, even if the brake pedal 11 is depressed or treaded when the hydraulic pressure supply source 20 is in a malfunction mode, the solenoid valves 41, 42 are not electrically energized so that the communication between the master cylinder 10 and each wheel cylinder WCfl, WCfr is established. As described above, each solenoid valve 41, 42 serve as a master cylinder cutoff valve.

Connected to the first outlet port 10a of the master cylinder 10 is a stroke simulator 30 to communicate with the first outlet port 10a. A solenoid valve 43 and a check valve 44 are arranged in parallel to each other between the master cylinder 10 and the stroke simulator 30.

The stroke simulator 30 is adapted to generate a brake-pedal stroke to the brake pedal 11 when a fluid communication between the master cylinder 10 and each wheel cylinder WCfl, WCfr is discontinued in a case where the hydraulic pressure supply source 20 is in a normal mode. The brake-pedal stroke corresponds to an operation state of the brake pedal 11. This stroke simulator 30 is a known stroke simulator, which is for example disclosed in JP2002-293229A, and absorbs an oil pressure (fluid pressure) supplied from the master cylinder 10 via the first outlet port 10a.

The solenoid valve 43 is a linear solenoid valve which is operated to control a level of pressure difference between an inlet port, and an outlet port, of the solenoid valve 43, i.e., a solenoid valve, which generates a pressure difference at a pressure level in proportion to electromagnetic force applied thereto. When the solenoid valve 43 is in an electrically de-energized mode (as illustrated in FIG. 2), a fluid communication between the first outlet port 10a of the master cylinder 10 and an inlet port 30a of the stroke simulator 30 is interrupted. Meanwhile, when the solenoid valve 43 is in an electrically energized mode, the fluid communication between the first outlet port 10a and the inlet port 30a is established so as to generate a pressure difference at a pressure level corresponding to an amount of electric current supplied to the solenoid valve 43. As described above, the solenoid valve 43 serves as a stroke simulator-cutting valve, which is electrically energized to be opened and to establish the fluid communication between the master cylinder 10 and the stroke simulator 30 when the hydraulic pressure supply source 20 is in a normal mode and is electrically de-energized to be closed and to interrupt the fluid communication therebetween when the hydraulic pressure supply source 20 is in a malfunction mode. The check valve 44 is arranged in parallel to the solenoid valve 43 between the first outlet port 10a of the master cylinder 10 and the inlet port 30a of the stroke simulator 30 and allows a fluid flowing only from the stroke simulator 30 to the master cylinder 10.

The hydraulic pressure supply source 20 includes an electric motor 21, a pump 22 and an accumulator 23. The pump 22 is driven by the electric motor 21 and pumps out a brake fluid, which is introduced from an inlet port 12a of the reservoir tank 12 to an inlet port 22a, from an outlet port 22b. The accumulator 23 communicates with the outlet port 22b of the pump 22 and houses brake fluid, which is supplied from the pump 22 at a high-pressure level, at a constant pressure level. When needed, the brake fluid accumulated in the accumulator 23 is supplied to each wheel cylinder WCfl-WCrr. A relief valve 24 is disposed between the outlet ports 22a, 22b of the pump 22. When brake fluid is pumped out from the pump 22 at a pressure level less than a predetermined pressure level, the relief valve 24 is closed, and when the pressure level is greater than, or equal to, the predetermined pressure level, the relief valve 24 is opened. Therefore, the hydraulic pressure supply source 20 supplies brake fluid pressurized at a predetermined high-pressure level to each wheel cylinder WCfl-WCrr.

The hydraulic pressure supply source 20 fluidly communicates with the wheel cylinder WCfl via the solenoid valve 45 when the solenoid valve 45 is in an electrically energized mode. The solenoid valve 45 is a linear solenoid valve in the same manner as the solenoid valve 43. When the solenoid valve 45 is in an electrically energized mode, the solenoid valve 45 is operated to generate a pressure difference corresponding to an amount of current supplied thereto so that the hydraulic pressure supply source 20 fluidly communicates with the wheel cylinder WCfl. Meanwhile, when the solenoid valve 45 is in an electrically de-energized mode as illustrated in FIG. 2, the fluid communication between the hydraulic pressure supply source 20 and the wheel cylinder WCfl is discontinued by the closed solenoid valve 45.

Moreover, when the solenoid valve 46 is in an electrically energized mode, the wheel cylinder WCfl fluidly communicates with the reservoir tank 12 via the solenoid valve 46. The solenoid valve 46 is a linear solenoid valve in the same manner as the solenoid valve 43. When the solenoid valve 46 is in an electrically energized mode, the solenoid valve 46 is operated to generate a pressure difference corresponding to an amount of current supplied thereto so that the wheel cylinder WCfl fluidly communicates with the reservoir tank 12. Meanwhile, when the solenoid valve 46 is in an electrically de-energized mode as illustrated in FIG. 2, the fluid communication between the wheel cylinder WCfl and the reservoir tank 12 is discontinued by the closed solenoid valve 46.

The hydraulic pressure supply source 20 fluidly communicates with the wheel cylinder WCfr via the solenoid valve 47 when the solenoid valve 47 is in an electrically energized mode. The solenoid valve 47 is a linear solenoid valve in the same manner as the solenoid valve 43. When the solenoid valve 47 is in an electrically energized mode, the solenoid valve 47 is operated to generate a pressure difference corresponding to an amount of current supplied thereto so that the hydraulic pressure supply source 20 fluidly communicates with the wheel cylinder WCfr. Meanwhile, when the solenoid valve 47 is in an electrically de-energized mode as illustrated in FIG. 2, the fluid communication between the hydraulic pressure supply source 20 and the wheel cylinder WCfr is discontinued by the closed solenoid valve 47.

Moreover, when the solenoid valve 48 is in an electrically energized mode, the wheel cylinder WCfr fluidly communicates with the reservoir tank 12 via the solenoid valve 48. The solenoid valve 48 is a linear solenoid valve in the same manner as the solenoid valve 46. When the solenoid valve 48 is in an electrically energized mode, the solenoid valve 48 is operated to generate a pressure difference corresponding to an amount of current supplied thereto so that the wheel cylinder WCfr fluidly communicates with the reservoir tank 12. Meanwhile, when the solenoid valve 48 is in an electrically de-energized mode as illustrated in FIG. 2, the fluid communication between the wheel cylinder WCfr and the reservoir tank 12 is discontinued by the closed solenoid valve 48.

The hydraulic pressure supply source 20 fluidly communicates with the wheel cylinder WCrl via the solenoid valve 51 when the solenoid valve 51 is in an electrically energized mode. The solenoid valve 51 is a linear solenoid valve in the same manner as the solenoid valve 45. When the solenoid valve 51 is in an electrically energized mode, the solenoid valve 51 is operated to generate a pressure difference corresponding to an amount of current supplied thereto so that the hydraulic pressure supply source 20 fluidly communicates with the wheel cylinder WCrl. Meanwhile, when the solenoid valve 51 is in an electrically de-energized mode as illustrated in FIG. 2, the fluid communication between the hydraulic pressure supply source 20 and the wheel cylinder WCrl is discontinued by the closed solenoid valve 51.

Moreover, when the solenoid valve 52 is in an electrically energized mode, the wheel cylinder WCrl fluidly communicates with the reservoir tank 12 via the solenoid valve 52. The solenoid valve 52 is a linear solenoid valve in the same manner as the solenoid valve 46. When the solenoid valve 52 is in an electrically energized mode, the solenoid valve 52 is operated to generate a pressure difference corresponding to an amount of current supplied thereto so that the wheel cylinder WCrl fluidly communicates with the reservoir tank 12. Meanwhile, when the solenoid valve 52 is in an electrically de-energized mode as illustrated in FIG. 2, the fluid communication between the wheel cylinder WCrl and the reservoir tank 12 is discontinued by the closed solenoid valve 52.

The hydraulic pressure supply source 20 fluidly communicates with the wheel cylinder WCrr via the solenoid valve 53 when the solenoid valve 53 is in an electrically energized mode. The solenoid valve 53 is a linear solenoid valve in the same manner as the solenoid valve 45. When the solenoid valve 53 is in an electrically energized mode, the solenoid valve 53 is operated to generate a pressure difference corresponding to an amount of current supplied thereto so that the hydraulic pressure supply source 20 fluidly communicates with the wheel cylinder WCrr. Meanwhile, when the solenoid valve 53 is in an electrically de-energized mode as illustrated in FIG. 2, the fluid communication between the hydraulic pressure supply source 20 and the wheel cylinder WCrr is discontinued by the closed solenoid valve 53.

Moreover, when the solenoid valve 54 is in an electrically energized mode, the wheel cylinder WCrr fluidly communicates with the reservoir tank 12 via the solenoid valve 54. The solenoid valve 54 is a linear solenoid valve in the same manner as the solenoid valve 46. When the solenoid valve 54 is in an electrically energized mode, the solenoid valve 54 is operated to generate a pressure difference corresponding to an amount of current supplied thereto so that the wheel cylinder WCrr fluidly communicates with the reservoir tank 12. Meanwhile, when the solenoid valve 54 is in an electrically de-energized mode as illustrated in FIG. 2, the fluid communication between the wheel cylinder WCrr and the reservoir tank 12 is discontinued by the closed solenoid valve 54.

The oil pressure gauges 61, 62 detect oil pressure of brake fluid supplied from the first and second outlet ports 10a, 10b of the master cylinder 10, respectively. An oil pressure gauge 63 detects oil pressure of brake fluid supplied from the hydraulic pressure supply source 20. Oil pressure gauges 64, 65, 66 and 67 detect oil pressure of brake fluid supplied to, or drained from, the wheel cylinders WCfl-WCrr, respectively. Detection results of the oil pressure gauges 61-67 are transmitted to the controller 70.

The wheel speed sensors SBfl, SBfr, SBrl and SBrr are mounted at a body of the vehicle M in the vicinity of the wheels Wfl, Wfr, Wrl and Wrr, respectively. Each wheel speed sensor SBfl, SBfr, SBrl and SBrr detects a speed of the corresponding wheel Wfl, Wfr, Wrl and Wrr, and the detected wheel speed is transmitted to the controller 70. The wheel speed sensor may be a known sensor, which is for example provided with permanent magnets, coils, probes (all not illustrated), and so on. For example, when a rotor, which is attached to a hub of the wheel rotating integrally with the wheel, rotates, magnetic flux varies at the probes, and an alternative signal is generated at the coils, which has a frequency in proportion to a speed of the wheel. The wheel speed sensor structured described above is inferior in detection precision due to incorrectly positioned poles of the magnets. Such wheel speed sensor does not perform appropriately to detect precisely especially when the vehicle M is running at a low speed.

The hydraulic brake system B is provided with a pedal stroke sensor 11a that is connected to the brake pedal 11 and detects a moving amount (i.e., a stroke amount or a pedal stroke) of the brake pedal 11. Detection result of the pedal stroke sensor 11a is transmitted to the controller 70.

The vehicle M is mounted with the receiver 71, an initialization switch (hereinafter, referred to as an initialization SW) 72, and a warning device 73. The receiver 71 is connected to an antenna 71a and to the controller 70. The receiver 71 receives, via the antenna 71a, rotation state, which is detected by each rotation state sensor SW1, SW2, SW3 and SW4 and is transmitted from each transmitter TR1-TR4, and transmits the rotation state to the controller 70.

Figure 14A:
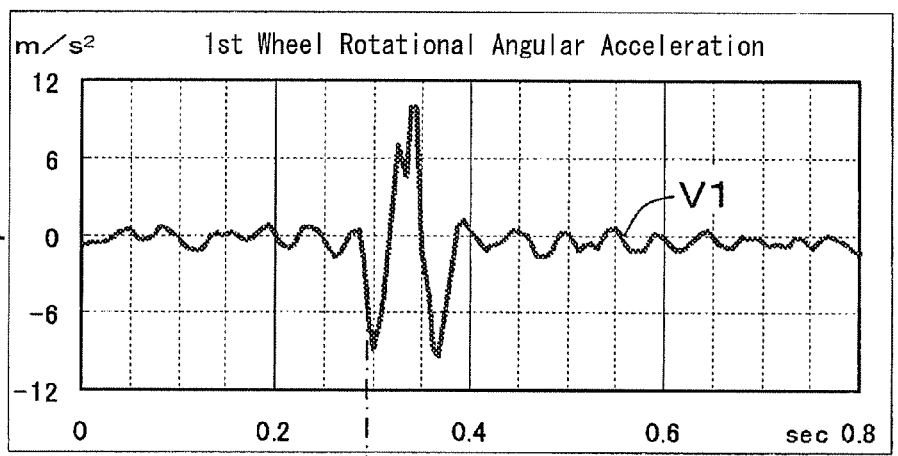
FIG. 14A is a timechart for explaining a first wheel rotational speed fluctuation of a first wheel.
Figure 14B:
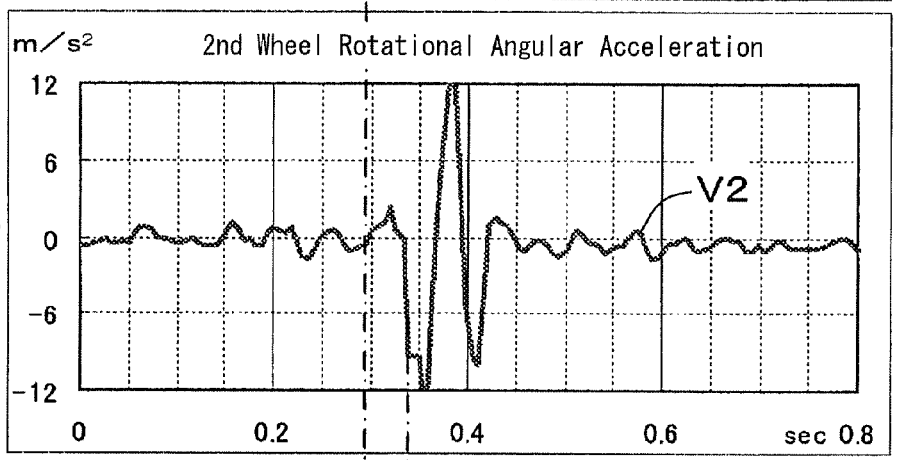
FIG. 14B is a timechart for explaining a second wheel rotational speed fluctuation of a second wheel.
Figure 16:
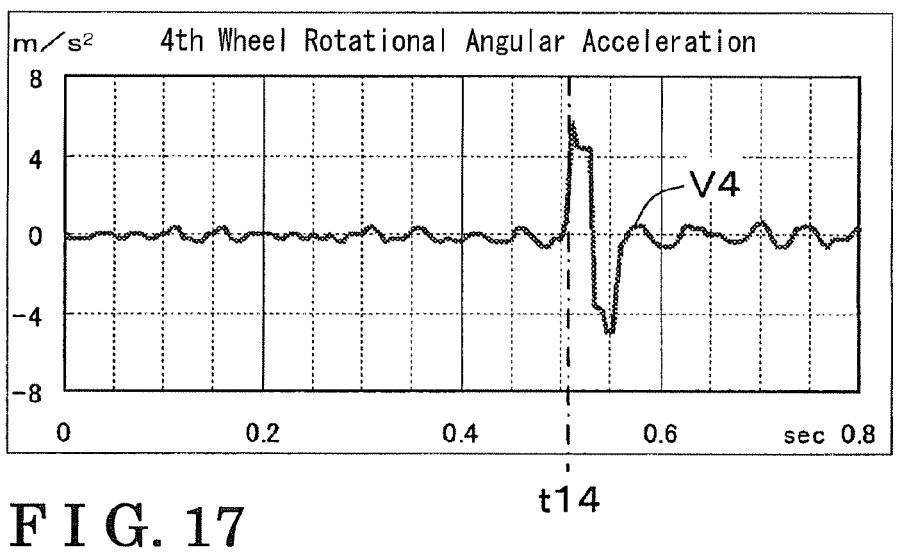
FIG. 16 is a timechart for explaining a fourth wheel rotational speed fluctuation of a fourth wheel.
Figure 17:
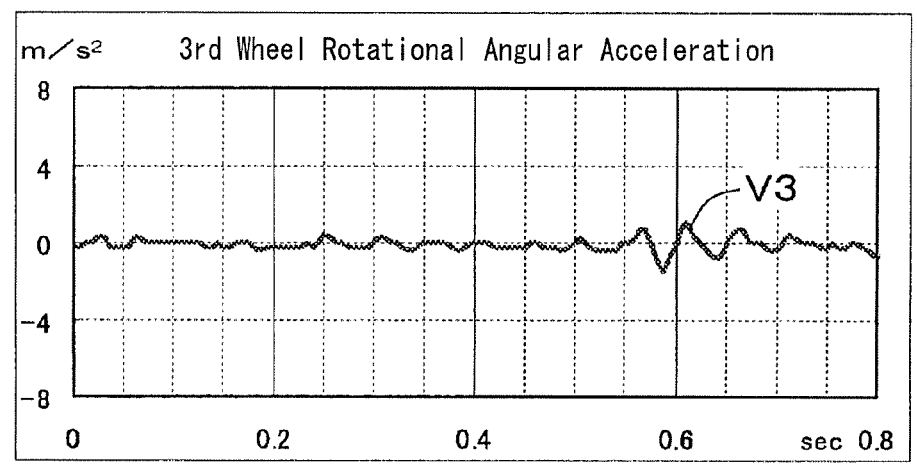
FIG. 17 is a timechart for explaining a third wheel rotational speed fluctuation of a third wheel.

The controller 70 derives or calculates first, second, third and fourth fluctuations in rotation V1, V2, V3 and V4 based upon the corresponding rotation state signal obtained from each rotation state sensor SW1, SW2, SW3 and SW4. The rotation state signal is an angular acceleration signal of the wheel, according to the embodiment. Each fluctuations in rotation V1 V2, V3 and V4 is a signal representing the state of fluctuations in rotational speed of each wheel W1, W2, W3 and W4 and is hereinafter referred to as a wheel rotational speed fluctuation V1, V2, V3 and V4. FIG. 14A is a time chart explaining an example of the first wheel rotational speed fluctuation V1, while FIG. 14B is a time chart explaining an example of the second wheel rotational speed fluctuation V2. FIG. 16 is a time chart explaining an example of the fourth wheel rotational speed fluctuation V4, and FIG. 17 is a time chart explaining an example of the third wheel rotational speed fluctuation V3.

The initialization SW72 is operated to initialize the position of each wheel W1-W4, i.e., to start identifying again the wheel position of each wheel W1-W4 after rotating or replacing the wheels. On/Off signal of the initialization SW 72 is sent to the controller 70. An occupant of the vehicle M turns on the initialization SW 72 when requiring an identification of the wheel position.

The warning device 73 is operated to warn an occupant of the vehicle M of a state of the vehicle M (e.g., reduction in air pressure of the wheel) and is configured with a display, such as a liquid crystal, a CRT, or a lamp, and a voice-output device, such as a buzzer, or a loud speaker. The warning device 73 is responsive to a command of the controller 70 and displays a waning in the display, emits a warning sound from the voice-output device, and sends a warning message by sound.

The vehicle M is equipped with an acceleration sensor 15a detecting an operating or depressing amount of the accelerator pedal 15. The operating amount of the accelerator pedal 15 is transmitted to the controller 70. The acceleration sensor 15a is substituted by a throttle opening degree sensor detecting an opening/closing amount of a throttle valve of an engine, an opening/closing amount of a throttle valve transmitted to the controller 70.

The controller 70 is connected to the pedal stroke sensor 11a, the electric motor 21, the solenoid valves 41, 42, 43, 45-48, 51-54, the oil pressure gauges 61-67, the wheel speed sensors SBfl, SBfr, SBrl, SBrr, the receiver 71, the initialization SW 72, and the warning device 73. The controller 70 is further connected to a steering sensor (not illustrated), which detects a steering angle of the vehicle M, the acceleration sensor 15a, which is attached to the accelerator pedal 15 and detects an operating amount of the accelerator pedal 15, a yaw rate sensor (not illustrated), which detects an actual yaw rate Y of the vehicle M, and an acceleration sensor (not illustrated), which detects accelerations of a vehicle in longitudinal and lateral directions.

The controller 70 incorporates therein a microcomputer (not illustrated) connected, via a bus, to an input/output interface, a CPU, a RAM, a ROM and a memory device (all not illustrated). The CPU of the controller 70 implements a brake control by controlling the operations of the electric motor 21 and each solenoid valve 41, 42, 43 45-48 and 51-54 based upon detection result of each sensor, thereby independently controlling oil pressure applied to each wheel cylinder WCfl, WCfr, WCrl and WCrr, i.e., independently controlling braking force applied to each wheel Wfl, Wfr, Wrl and Wrr.

Through the programs of flowcharts illustrated in FIGS. 4-11, the CPU generates fluctuations in oil pressure by independently controlling the oil pressure supplied to each wheel cylinder WCfl-WCrr, in advance associated with the position of the corresponding wheel W1-W4. The fluctuation in oil pressure level at each wheel cylinder is hereinafter referred to as a W/C oil pressure fluctuation. The CPU then obtains the presence, or absence, of a response, which is outputted from the wheel side and responsive to the W/C oil pressure fluctuation. The presence, or absence, of the response is determined based upon the rotation state of each wheel W1-W4, the rotation state which is obtained from the corresponding rotation state sensor SW1-SW4 mounted on the corresponding wheel W1-W4. Further, the CPU identifies the wheel position (wheel position identifying control) by associating each wheel W1-W4 with each wheel cylinder WCfl-WCrr based upon a combination of a presence, or an absence, of the W/C oil pressure fluctuation and a presence, or an absence, of the response. The RAM temporarily stores therein variables necessary to execute the programs. The ROM stores therein the programs. The memory devices memorize therein each rotation state outputted from the corresponding rotation state sensor SW1-SW4 and each wheel rotational speed fluctuation V1-V4.

Flowcharts depicted in FIGS. 4-11 explain the operation of the wheel position identifying apparatus. When an ignition switch of the vehicle M is turned on, the controller 70 initiates a main program in FIG. 4 for the wheel position identifying control (processes). In step 102, the controller 70 judges a presence, or an absence, of an on signal outputted from the initialization SW 72, thereby judging whether a requirement is placed on an identification of the wheel position. When the controller 70 is inputted with an on signal from the initialization SW 72, the controller 70 judges that the identification of the wheel position is required. Otherwise, the controller 70 judges that the identification of the wheel position is not required.

When the identification of the wheel position is required, an affirmative answer "Yes" is obtained in step 102. The program proceeds to step 104, in which the controller 70 learns a level of noise contained in each wheel rotational speed fluctuation V1-V4. In step 106, the controller 70 identifies wheels placed at the front wheel positions. In step 108, the controller 70 identifies wheels placed at the rear wheel positions. Meanwhile, when the identification of the wheel position is not required, a negative answer "No" is obtained in step 102. A negative answer "No" is repeatedly obtained in step 102 until the controller 70 recognizes the presence of the requirement on an identification of the wheel position.

Figure 5:
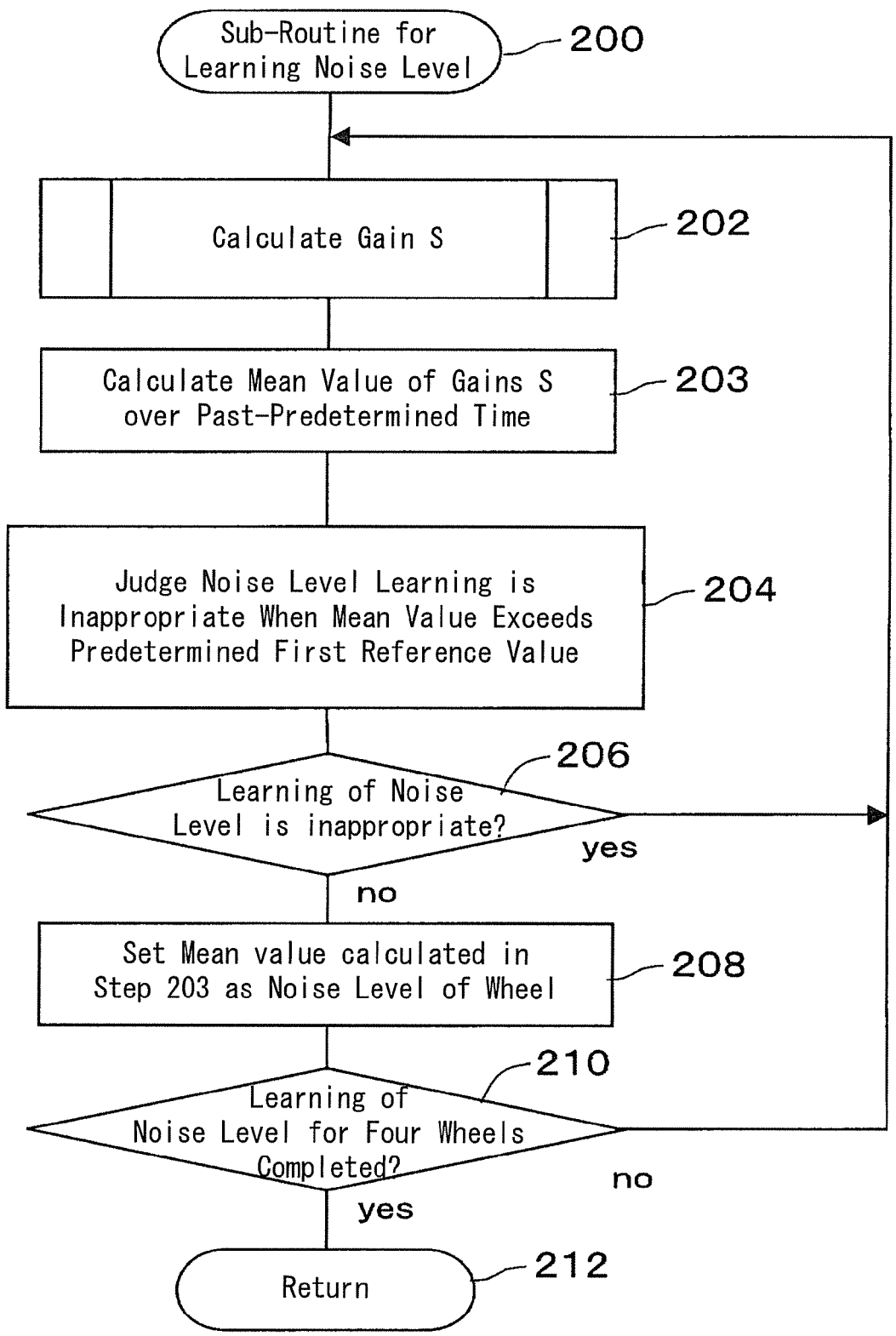
FIG. 5 is a flowchart for explaining a sub-routine for learning a noise level implemented by the controller illustrated in FIG. 2.

Step 104, in which a learn-mode is applied, includes a sub-routine for learning a level of noise illustrated in FIG. 5. More specifically, in step 202, the controller 70 calculates a gain S at every cycle where the sub-routine in FIG. 5 is initialized. The gain S is an evaluation value referred to evaluate each wheel rotational speed fluctuation.

Figure 6:
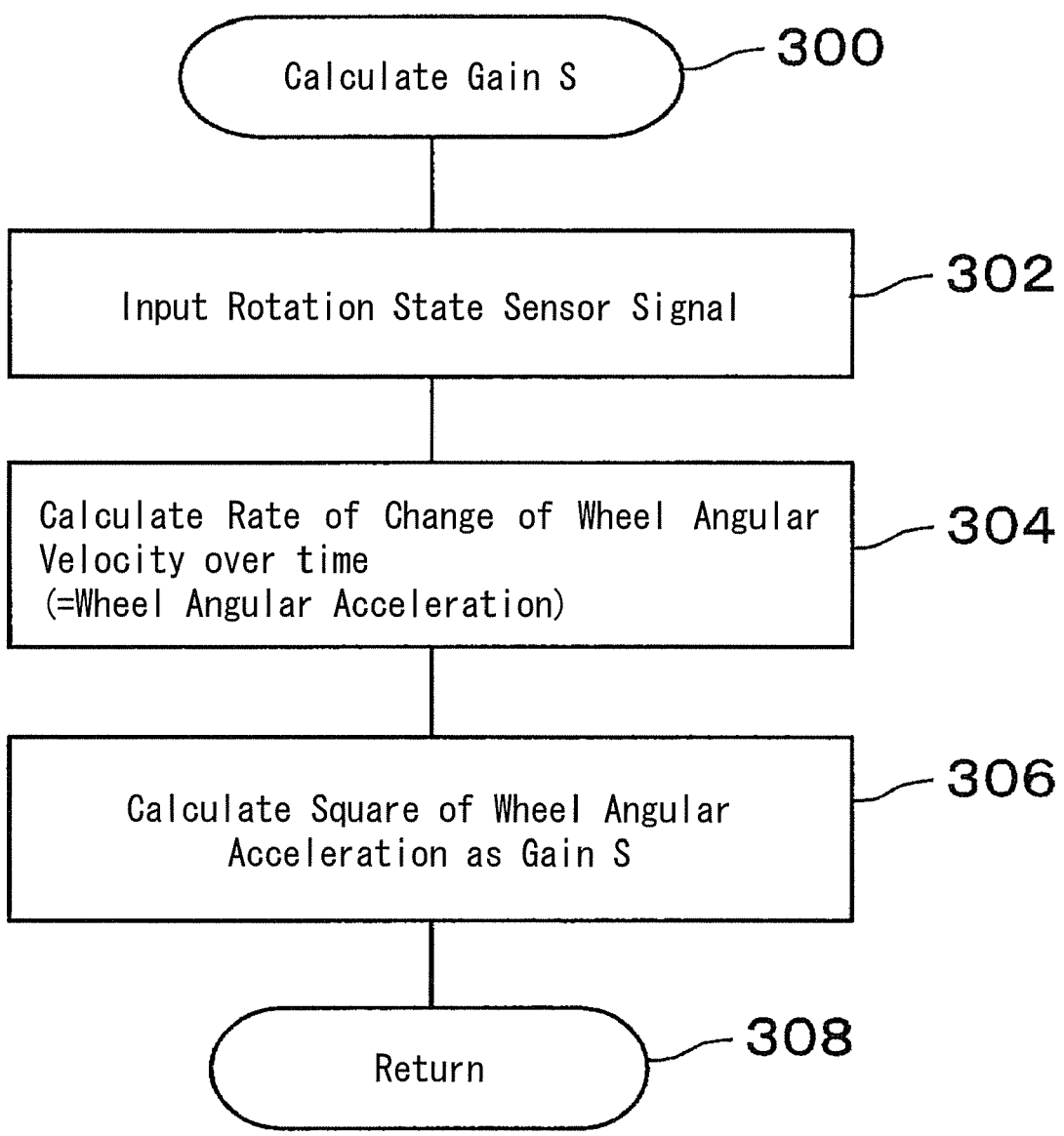
FIG. 6 is a flowchart for explaining a sub-routine for calculating a gain implemented by the controller illustrated in FIG. 2.

Step 202, in which the gain S is calculated, includes a sub-routine for calculating a gain S illustrated in FIG. 6. More specifically, in step 302, the controller 70 is inputted with a rotation state signal from each rotation state sensor SW1-SW4 at every cycle where the subroutine in FIG. 6 is initialized in step 303. In step 304, the controller 70 calculates the angular acceleration of each wheel W1-W4 based upon the rotation state signal from each rotation state sensor SW1-SW4. An angular acceleration is the rate of change of angular velocity over time. It is preferable that the angular acceleration calculated in step 304 is high-pass filtered. The angular accelerations of the wheels W1-W4 correspond to the wheel rotational speed fluctuations V1-V4, respectively. FIG. 14A is a timechart explaining a time-based transition of the first wheel rotational speed fluctuation V1. According to the embodiment, the controller 70 identifies the wheel position of the wheel as described later even if the time-based data is not stored over long time duration. In step 306, the controller 70 calculates a square of the angular acceleration of each wheel W1-W4 or calculates the sum of squares of the angular accelerations of each wheel W-W4 for a predetermined period of time (e.g., 30 msec). In step 306, the square of the angular acceleration, or the sum of squares of the angular accelerations, of each wheel W1-W4 is set as the gain S. The program then proceeds to step 308 and the sub-routine in FIG. 6 is temporarily terminated.

The program then proceeds to step 203 of the sub-routine for learning a level of noise in FIG. 5. In step 203, the controller 70 calculates a mean value of the gains S over the past-predetermined period of time (e.g., 1 sec) for each wheel W1-W4, and the mean value is saved as a mean value of the gain S for each wheel W1-W4.

When the mean value of the gain S saved in Step 203 exceeds a first predetermined reference value, the controller 70 determines that a level of noise is not learned appropriately. On the other hand, if not so, the controller 70 determines that a level of noise is learned appropriately. The first reference value is given in advance in consideration of an allowance range of a level of vibrations of the tire and an allowance range of a level of noise, which occurs during running of a vehicle and is responsive to a state of a road surface. That is, the first reference value is designed at a value, which does not depend on noise created while the vehicle M is running on a rough road, and which is responsive to noise created while the vehicle M is running on a normal road and to vibrations of the tire.

When the controller 70 recognizes a level of noise is not learned appropriately, an affirmative answer "Yes" is obtained in Step 206 and the program returns to step 202. Steps 202, 203, 204 are repeatedly executed until the controller 70 recognizes that a level of noise is learned appropriately. When the controller 70 recognizes that a level of noise is learned appropriately, a negative answer "No" is obtained in step 206 and the program proceeds to step 208. In step 208, the mean value saved for each wheel in step 203 is set as a noise level of the wheel. Here, a judgment threshold value is determined based upon the noise level of each wheel. For example, the judgment threshold value is determined by adding a predetermined value to the noise level set in step 208 or by multiplying the noise level set in step 208 by a predetermined value. The judgment threshold value is compared with the wheel rotational speed fluctuation (a square of the angular acceleration of each wheel W1-W4) so that a presence, or an absence of, changes in an actual rotation of the wheel is judged.

In step 210, the controller 70 judges whether learning of noise level is completed for all of the four wheels. When the levels of noise for all of the four wheels are learned, an affirmative answer "Yes" is obtained in step 210. The program then proceeds to step 212 and the sub-routine in FIG. 5 is terminated. On the other hand, when the controller 70 has not finished learning noise level of either one of the four wheels, a negative answer "No" is obtained in step 210. The program then returns to step 202, and steps 202, 203, 204, 206 and 208 are repeatedly executed until learning of noise level is completed for all of the four wheels.

According to the noise level-learning process described above, a level of the wheel rotational speed fluctuation is learned and the judgment threshold value is changed in response to the learning result. That is, the judgment threshold value is changed in response to fluctuations in the state of the wheel or the tire, to which the wheel position identification control (processes) is applied, even when the tire is unbalanced or worn out due to aging. Moreover, the judgment threshold value may be changed in response to the state of a road surface, to which the wheel position identification control (processes) is applied. Therefore, the wheel position identification control (process) is implemented after learning a level of noise due to fluctuations in rotation of the wheel due to biased wear-out or unbalancing of the tire and after learning a level of noise created while the vehicle M is running on a normal road surface. That is, the judgment threshold value employed according to the embodiment is changed appropriately in response to a state of the wheel, the tire, and the road surface. As a result, the controller 70 determines appropriately a presence, or an absence, of a wheel rotational speed fluctuation, reliably obtains a response relative to the W/C oil pressure fluctuation and then identifies the position of each wheel with high reliability.

Figure 4:
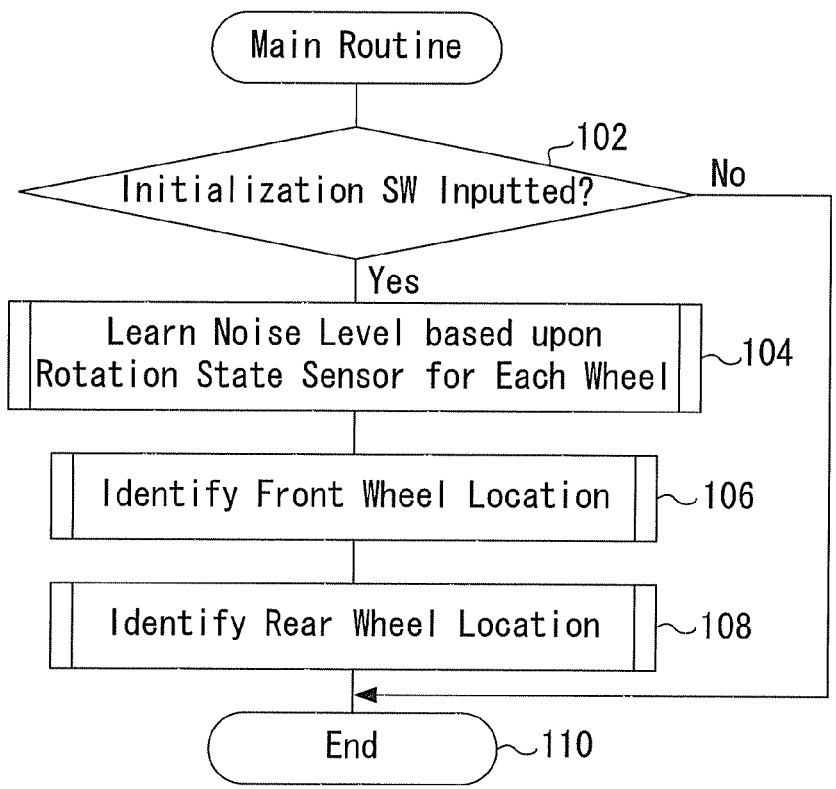
FIG. 4 is a flowchart explaining a main program implemented by a controller illustrated in FIG. 2.

After temporarily terminating the noise level learning process, the program proceeds to step 106 in FIG. 4, in which a front wheel identification sub-routine is executed so as to identify the wheels located at the front of the vehicle M. More specifically, the controller 70 judges in step 402 whether the wheels located at the front of the vehicle M are to be identified at every cycle where the front wheel identification sub-routine is initialized as shown in step 400 of FIG. 7.

Figure 8:
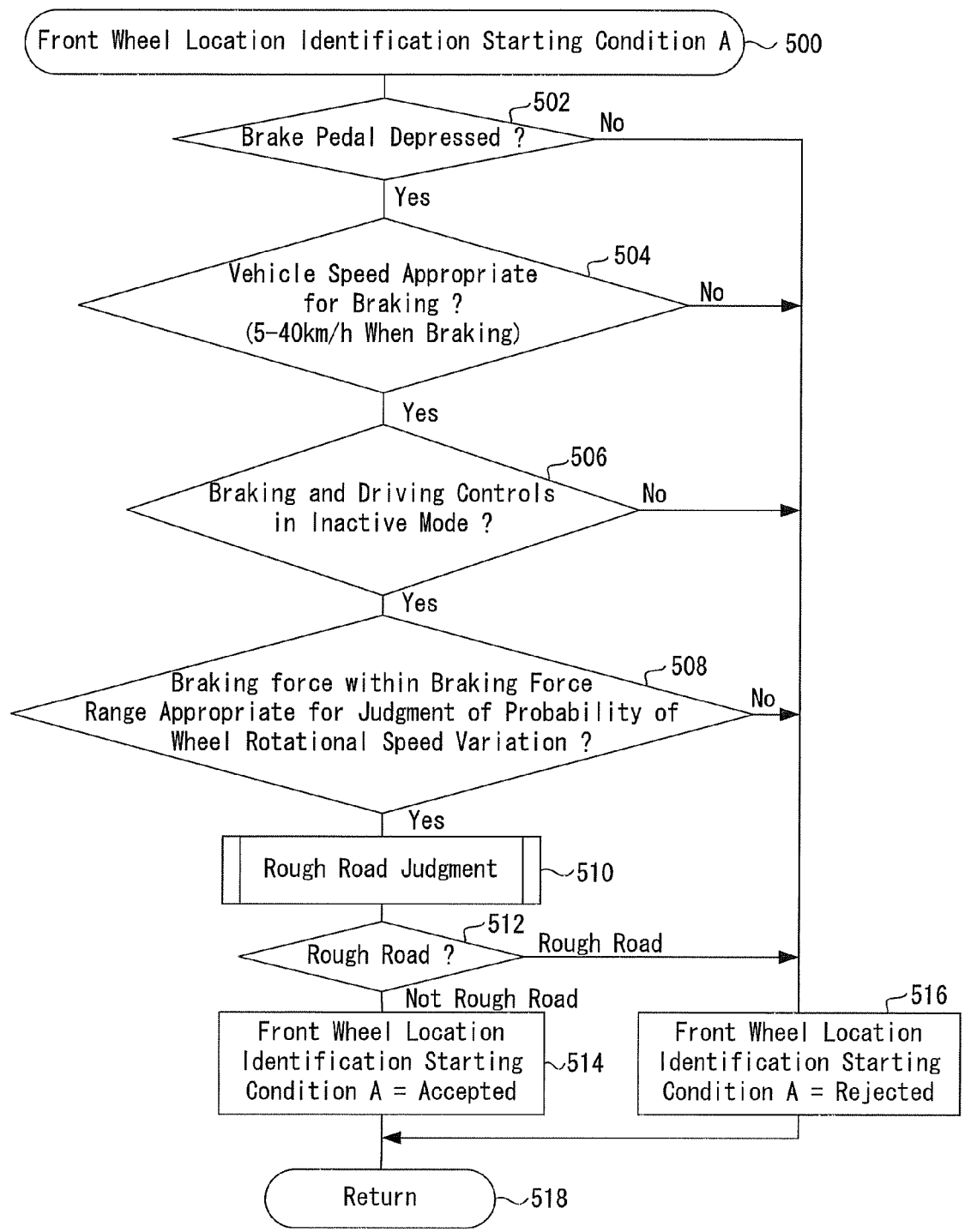
FIG. 8 is a flowchart for explaining a sub-routine for judging a front wheel position identification starting condition A implemented by the controller illustrated in FIG. 2.
Figure 9:
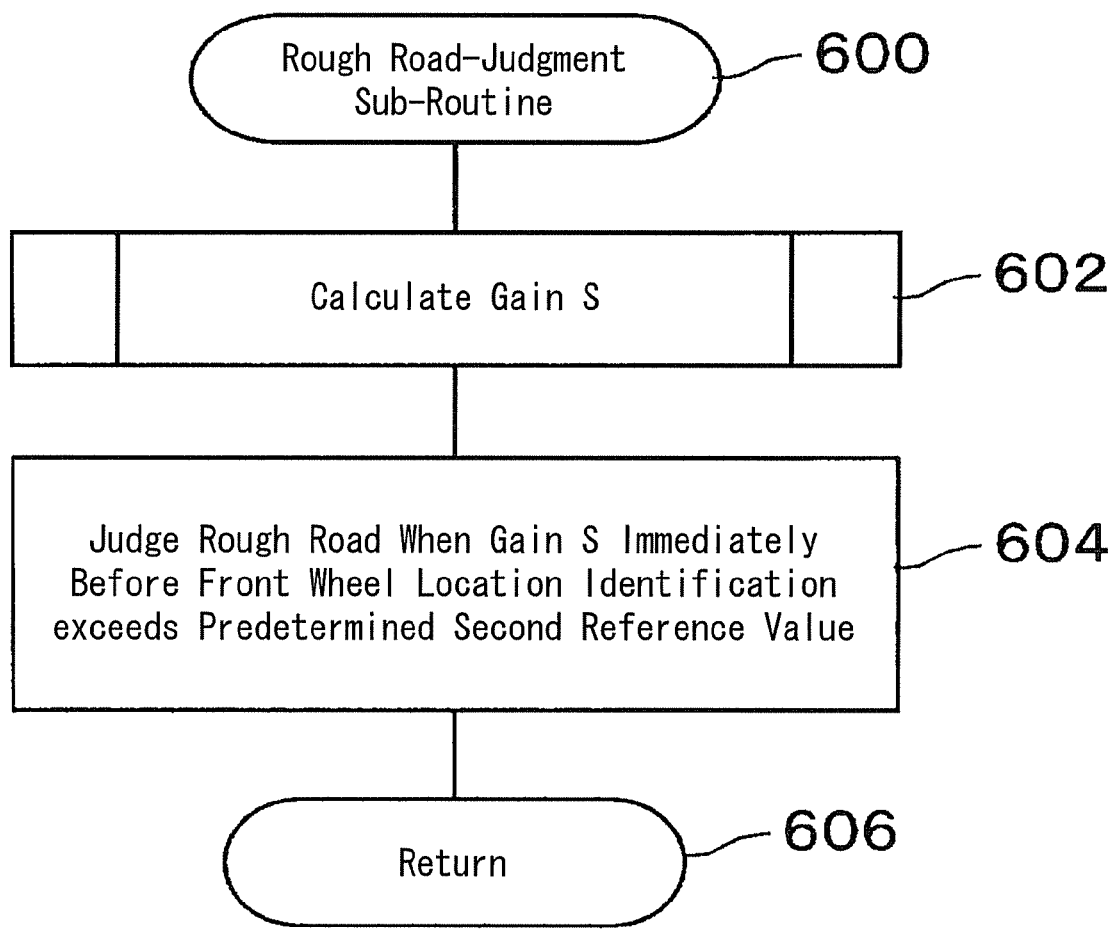
FIG. 9 is a flowchart for explaining a rough road-judgment sub-routine implemented by the controller illustrated in FIG. 2.
Figure 10:
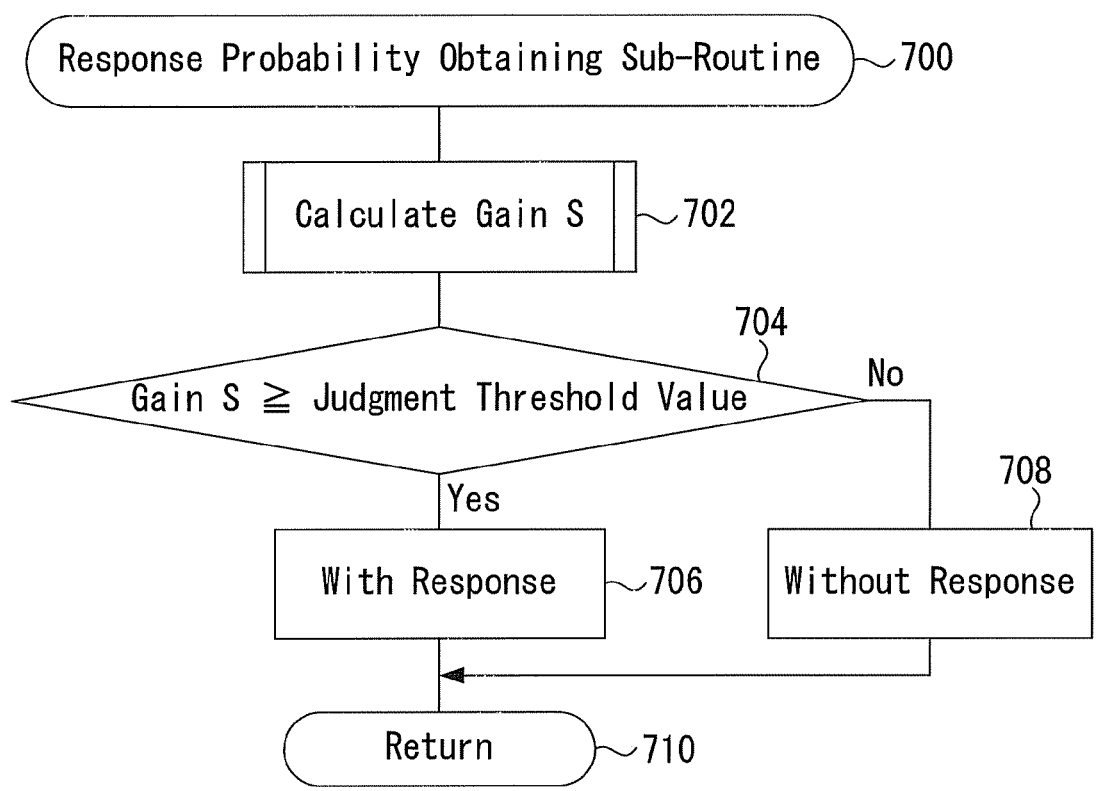
FIG. 10 is a flowchart for explaining a sub-routine for obtaining a presence, or an absence, of a response relative to W/C oil pressure fluctuation, the sub-routine implemented by the controller illustrated in FIG. 2.

In step 402, the controller 70 implements a sub-routine to judge a front wheel position identification starting condition A in FIG. 8. More specifically, the controller 70 judges (steps 502-512) whether a current condition is satisfied to change a level of oil pressure applied to at least one of the wheel cylinders WCfl-WCrr at every cycle where the sub-routine in FIG. 8 is initialized in step 500.

In step 502, the controller 70 judges a presence, or an absence, of a braking requirement by a driver. More specifically, the controller 70 judges whether the brake pedal 11 is operated or depressed by the driver, based upon detection results of the pedal stroke sensor 11a and/or the oil pressure gauges 61, 62. According to the embodiment, the controller 70 initiates the front wheel identification control when a driver requires to brake the vehicle M.

In step 504, the controller 70 judges whether the operation of the brake pedal 11 by the driver is implemented when the vehicle M is running at a speed appropriate for depressing the brake pedal 11. The controller 70 calculates a speed of the vehicle M at a time of braking by the driver, i.e., at a time where the driver steps on the brake pedal 11, based upon speeds of wheels outputted from the wheel speed sensors SBfl-SBrr. When an actual vehicle speed at a time of initial braking falls within a predetermined speed range, such as 5-40 km/h, the controller 70 judges that the operation of the brake pedal 11 by the driver is implemented when the vehicle M is running at a speed appropriate for depressing the brake pedal 11. If not so, the controller 70 judges that the operation of the brake pedal 11 by the driver is not implemented when the vehicle M is running at a speed appropriate for depressing the brake pedal 11. As described above, the controller 70 can recognize whether the speed of the vehicle M at a time of braking by the driver is appropriate, in order to implement the front wheel position identification control.

In step 506, the controller 70 judges whether braking control by the brake actuator C, such as an ABS control, an ESC control, and a driving control are each in an inactive mode. More specifically, the controller 70 judges whether the braking control and the driving control is in an inactive mode, based upon command signals emitted to the brake actuator C. On occasions where the braking control and the driving control are in an active mode, the controller 70 does not implement the front wheel position identification control. In this case, the front wheel position identification control is implemented the next time when the driver requests to brake the vehicle M, i.e., when the driver steps on the brake pedal the next time. On occasions when the braking control and the driving control are in an inactive mode, the controller 70 permits implementation of the front wheel position identification control.

In step 508, the controller 70 judges whether an actual braking force responsive to a brake operation of this time falls within a range of the braking force that is effective for judgment. Here, "judgment" represents judging a presence, or an absence, of the wheel rotational speed fluctuation that occurs due to changes in a level of oil pressure supplied to each wheel cylinder WCfl-WCrr. In step 508, a vehicle braking acceleration (vehicle deceleration) is derived based upon a master cylinder pressure detected by the oil pressure gauges 61, 62 or based upon a stroke of the brake pedal 11 detected by the pedal stroke sensor 11a. When an actual vehicle braking acceleration (actual vehicle deceleration) falls within a predetermined range, the controller 70 determines that an actual braking force falls within the aforementioned range the braking force. If not so, the controller 70 determines that an actual braking force deviates from the aforementioned range of the braking force. The predetermined range of the vehicle braking acceleration (vehicle deceleration) covers for example 0.05-0.2 G. The vehicle braking acceleration starting from 0.05 G and ending at 0.2 G is a level of braking acceleration that is reached frequently by a normal driver under the same vehicle type.

As described above, when deceleration applied to the vehicle M falls within the predetermined range, the front wheel position identification control (described later) is implemented. Therefore, the front wheel position identification control is implemented for example not at a sudden braking but when the vehicle M is braking in a safe and normal manner. Further, the front wheel position identification control is not implemented when the vehicle M is braking at an extremely low deceleration. Therefore, it is possible to reliably detect the wheel rotational speed fluctuation (response) which is attributed to the W/C oil pressure fluctuation.

In step 510, the controller 70 judges whether a road surface, on which the vehicle M is actually running, is a rough road. More specifically, the controller 70 implements a rough road-judgment sub-routine illustrated in FIG. 9. In step 602, the controller 70 calculates the gain S in the same manner as step 202 at every cycle where the rough road-judgment sub-routine is initiated in step 600. The gain S calculated in step 602 is a value obtained immediately before executing the process for identifying the front wheel position. It is preferable that a mean value over a predetermined time immediately before the process for identifying the front wheel position is employed as the gain S. In step 604, when the gain S calculated in step 602 exceeds a second predetermined reference value, the controller 70 judges a road surface, on which the vehicle M is actually running, is a rough road. If not so, the controller 70 judges the road surface is not a rough road. The second reference value is obtained by adding the noise level learned in advance to a predetermined value representing a level of noise created while the vehicle M is running on a rough road. After the road-surface judgment in step 604, the program proceeds to step 606 so as to terminate the rough road-judgment sub-routine. The program then proceeds to step 512 in FIG. 8, in which the controller 70 judges, based upon the result of the rough road-judgment subroutine in FIG. 9, whether the vehicle M is running on a rough road.

When a negative answer "No" is obtained in any of steps 502-508 or when the controller 70 judges in step 512 "Rough Road", the controller 70 determines that a front wheel position identification process is not allowed to start. In other words, the controller 70 determines that a judgment of a presence, or an absence, of the wheel rotational speed fluctuation, which occurs due to the W/C oil pressure fluctuation, is not allowed to start. In step 516, the front wheel position identification starting condition A is rejected. The program then proceeds to step 518 and the sub-routine in FIG. 8 is temporarily terminated. On the other hand, when an affirmative answer "Yes" is obtained in any of steps 502-508 and when the controller 70 judges in step 512 "Not Rough Road", the controller 70 determines that a front wheel position identification process is allowed to start. In step 514, the front wheel position identification starting condition A is accepted. The program then proceeds to step 518 so as to temporarily terminate the sub-routine in FIG. 8.

Figure 7:
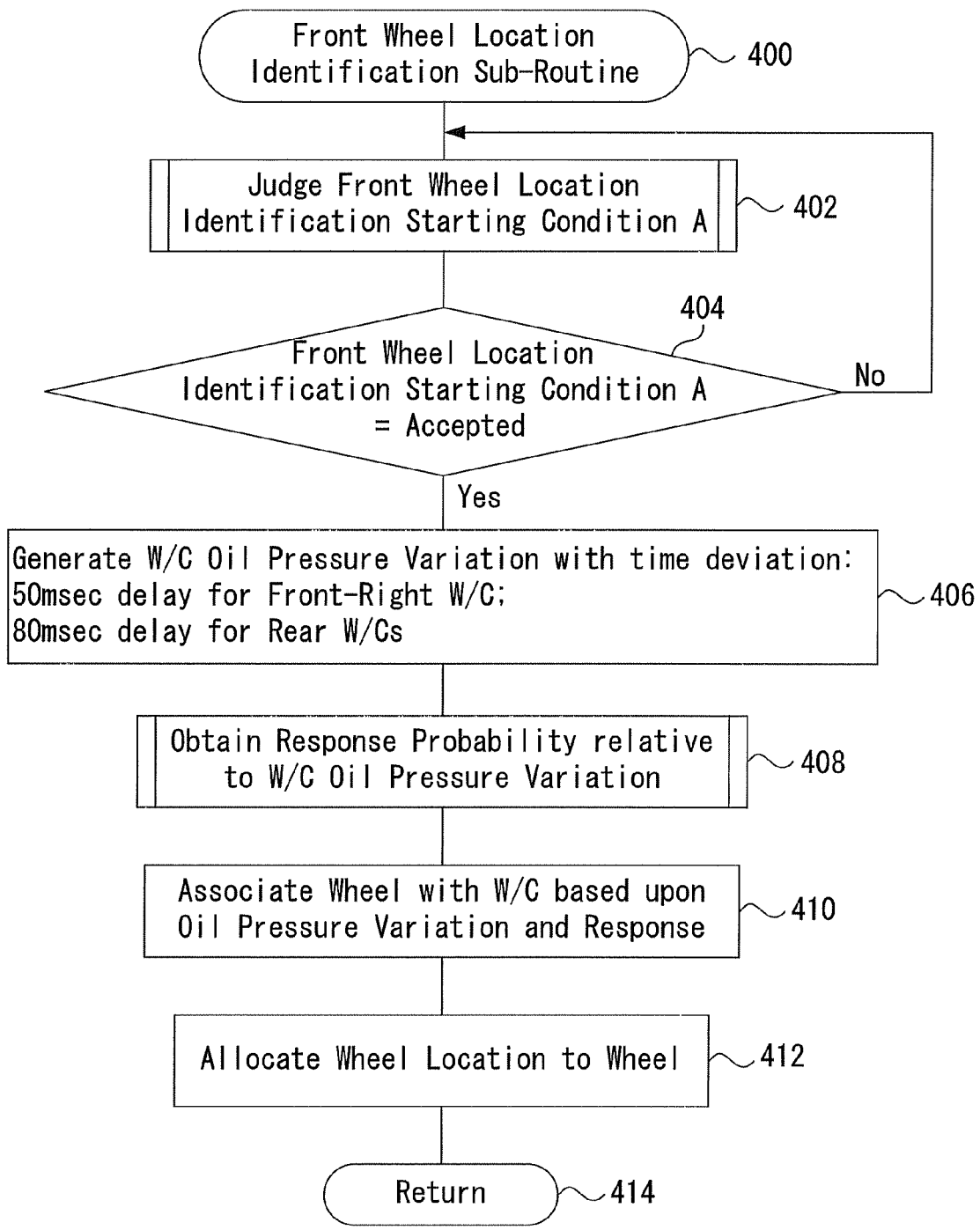
FIG. 7 is a flowchart for explaining a sub-routine for identifying a front wheel position implemented by the controller illustrated in FIG. 2.

The controller 70 returns the program to step 404 in FIG. 7 after terminating the sub-routine for judging the front wheel position identification starting condition A. When the front wheel position identification starting condition A is rejected, a negative answer "No" is obtained in step 404. Steps 402 and 404 are repeatedly executed until the front wheel position identification starting condition A is accepted. On the other hand, when the front wheel position identification starting condition A is accepted, an affirmative answer "Yes" is obtained in step 404 and the front wheel position identification control is implemented.

In step 406, the controller 70 generates the W/C oil pressure fluctuation at least either the wheel cylinder WCfl or WCfr. According to the embodiment, the W/C oil pressure fluctuation is generated at each wheel cylinder WCfl, WCfr separately or one-by-one. Specifically, when an amount of braking force to be applied to the vehicle M increases, i.e., simultaneously when the driver requires to brake the vehicle M or simultaneously when stepping on the brake pedal 11 (time t1 in FIG. 13), the controller 70 generates the W/C oil pressure fluctuation only at the wheel cylinder WCfl placed at the front-left position of the vehicle M. The W/C oil pressure fluctuation at the wheel cylinder WCfl corresponds to a required level of deceleration of the vehicle M, i.e., an operation or an operation state of the brake pedal 11.

Figure 13A:
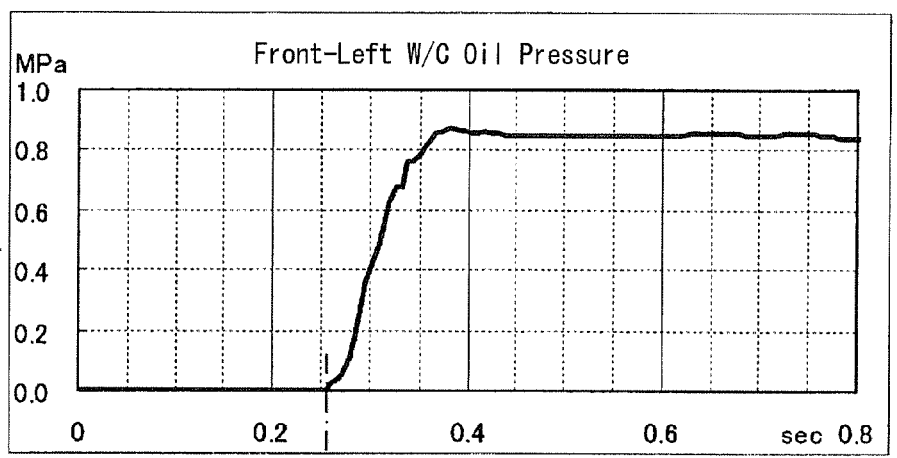
FIG. 13A is a timechart for explaining a W/C oil pressure fluctuation of a front-left wheel cylinder.
Figure 13B:
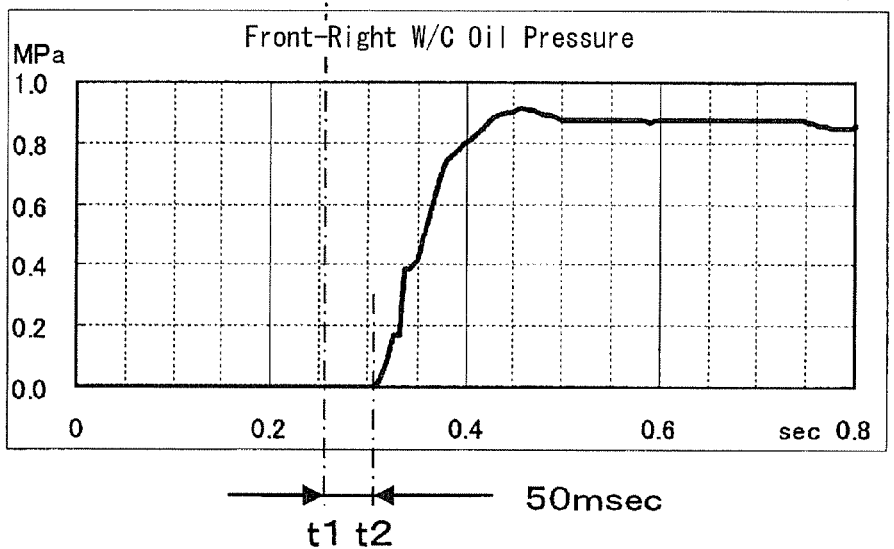
FIG. 13B is a timechart for explaining a W/C oil pressure fluctuation of a front-right wheel cylinder.

The controller 70 then generates the W/C oil pressure fluctuation only at the wheel cylinder WCfr placed at the front-right position of the vehicle M with a time deviation from the start of generating the W/C oil pressure fluctuation at the wheel cylinder WCfl described above. Here, the W/C oil pressure fluctuation at the wheel cylinder WCfr corresponds to the required level of deceleration of the vehicle M. For example, the controller 70 generates the W/C oil pressure fluctuation at the wheel cylinder WCfr at time t2 in FIG. 13 that is a predetermined short period post-time point from time t1. Here, the predetermined short period may be 50 msec for example. The W/C oil pressure fluctuations at the wheel cylinder WCfl, WCfr are depicted in FIGS. 13A and 13B, respectively.

Thereafter, the controller 70 generates the W/C oil pressure fluctuation at each wheel cylinder WCrl, WCrr placed at rear-left and rear-right positions of the vehicle M with a time deviation from the start of generating the W/C oil pressure fluctuation at the wheel cylinder WCfr. Here the W/C oil pressure fluctuation at each wheel cylinder WCrl, WCrr corresponds to a required level of deceleration of the vehicle M. For example, the controller 70 generates the W/C oil pressure fluctuation at each wheel cylinder WCrl, WCrr at a time that is a predetermined short period post-time point from time t1. Here, the predetermined short period may be 80 msec for example.

Through steps 408, 410 and 412 of the flowchart in FIG. 7, the controller 70 verifies the W/C oil pressure fluctuation generated at each wheel cylinder WCfl, WCfr and responses each responsive to the W/C oil pressure fluctuation at each wheel cylinder and obtained based upon the rotation state signal (acceleration signal) outputted from each rotation state sensor SW1-SW4. As a result, the controller 70 identifies the wheel position of each first and second wheel W1, W2. Specifically, in step 408, the controller 70 obtains or recognizes a presence, or an absence, of a response of each wheel W1, W2, W3 and W4 relative to the W/C oil pressure fluctuation at each wheel cylinder WCfl, WCfr. In step 410, the controller 70 associates each wheel from among the wheels W1-W4 with each wheel cylinder from among the wheel cylinders WCfl-WCrr respectively based upon a presence, or an absence, of the W/C oil pressure fluctuation at each wheel cylinder WCfl, WCfr and a response obtained from each wheel. In Step 412, the controller 70 allocates the position of the wheel cylinder, to which each wheel is associated respectively, as the position of each wheel.

In step 408, the controller 70 obtains a presence, or an absence, of a response of each wheel W1, W2, W3 and W4 relative to the W/C oil pressure fluctuation at each wheel cylinder WCfl, WCfr. More specifically, the controller 70 implements a response probability obtaining sub-routine illustrated in FIG. 10. In step 702, the controller 70 calculates the gain S in the same manner as step 202 at every cycle where the response probability obtaining sub-routine is started in step 700. In step 704, the controller 70 judges whether the gain S calculated in step 702 is greater than, or equal to, the judgment threshold value. When the gains S is greater than, or equal to, the judgment threshold value, an affirmative answer "Yes" is obtained in step 704, and the program proceeds to step 706. In step 706, the controller 70 confirms a presence of the wheel rotational speed fluctuation and memorizes the time where the wheel rotational speed fluctuation is generated. In other words, in step 706, the controller 70 confirms a presence of a response of the wheel relative to the W/C oil pressure fluctuation. Meanwhile, when the gain S is less than the judgment threshold value, a negative answer "No" is obtained in step 704, and the program proceeds to step 708. In step 708, the controller 70 confirms an absence of a response of the wheel relative to the W/C oil pressure fluctuation. Thereafter, the program proceeds to step 710 so as to temporarily terminate the response probability obtaining sub-routine. The judgment threshold value is obtained by adding a predetermined value responsive to an amount of braking force into the level of noise learned as described above. The judgment threshold value is designed in consideration of a structure of a brake (a difference between a disc brake and a drum brake).

For example, when the first wheel rotational speed fluctuation V1 of the first wheel W1 appears as illustrated in FIG. 14A, the controller 70 obtains "With Response" which represents a presence of the wheel rotational speed fluctuation of the first wheel W1 at time t11 that is a predetermined period post-time point from time t1. When the second wheel rotational speed fluctuation V2 of the second wheel W2 appears as illustrated in FIG. 14B, the controller 70 obtains "With Response" which represents a presence of the wheel rotational speed fluctuation of the second wheel W2 at time t12 that is a predetermined period post-time point from time t2. A time gap between time 11 and time 12 is substantially equal to the time gap (50 msec) defined to generate the W/C oil pressure fluctuation at the wheel cylinder WCfr. The predetermined period time is designed at a time (e.g., 0.05 sec) required to generate the wheel rotational speed fluctuation at the wheel in response to the W/C oil pressure fluctuation. This predetermined period of time varies in accordance with each component of the hydraulic brake system B.

While monitoring the first wheel rotational speed fluctuation V1 based upon a rotational state signal outputted from the rotation state sensor SW1, the controller 70 senses the gain S being greater than, or equal to the judgment threshold value by a total of six times. This is applied to the second rotational fluctuation V2. According to the embodiment, only the gain S, which first appears to be greater than, or equal to, the judgment threshold value, is employed. Further, the gains S, which secondly and thirdly appear to be greater than, or equal to, the judgment threshold value, may however be applied. In this case, the response probability obtaining sub-routine in FIG. 10 may be added with another condition in which multiple gains S are greater than, or equal to, the judgment threshold value. Still further, a sum of gains S for an appropriate period (e.g., 30 msec) may be employed. In this case, the comparison result between the gain S and the judgment threshold value is less affected by noise.

Described below is a relationship between the W/C oil pressure fluctuation generated at the wheel cylinder and the wheel rotational speed fluctuation. When generating oil pressure at the wheel cylinder and applying braking force to the wheel by use of frictional force generated between a disc rotor and pads, the tire Wa1, which exists between the wheel Wb1 and the road surface, acts as an elastic body. That is, torque, which is transmitted to the wheel W1, fluctuates instantaneously due to the braking force applied to the vehicle M. The torque fluctuations do not allow a tread of the tire Wa1 to rotate as a rigid body with the wheel Wb1. As a result, the side portion of the tire Wa1 is twisted and vibrates in a tire rotating direction. Therefore, in a case of increasing oil pressure supplied to the wheel cylinder, the angular acceleration of the wheel turns to negative and then oscillates. In a case of reducing oil pressure supplied to the wheel cylinder, the angular acceleration of the wheel turns to positive and then oscillates.

In step 410, the controller 70 verifies or compares a presence, or an absence, of the W/C oil pressure fluctuations obtained in step 406 and a presence, or an absence, of the response of each wheel W1-W4 obtained in step 408. The controller 70 associates each wheel W1-W4 with each wheel cylinder WCfl-WCrr at which W/C oil pressure fluctuation is generated. Here, especially the wheel cylinders WCfl, WCfr arranged at the front left and right positions of the vehicle M are associated with each wheel W1-W4.

As illustrated in FIGS. 14A and 14B, only the first wheel W1, of which the wheel rotational speed fluctuation occurs at time t11, responds to the W/C oil pressure fluctuation of the wheel cylinder WCfl, and the other wheels W2, W3 and W4 do not respond to the W/C oil pressure fluctuation of the wheel cylinder WCfl. Therefore, the controller 70 associates the wheel cylinder WCfl, at which the W/C oil pressure fluctuation is generated, with the wheel W1, which responds to the W/C oil pressure fluctuation at the wheel cylinder WCfl. The controller 70 then identifies the wheel position of the first wheel W1. Further, as illustrated in FIGS. 14A and 14B, only the second wheel W2, of which the wheel rotational speed fluctuation occurs at time t12, responds to the W/C oil pressure fluctuation of the wheel cylinder WCfr, and the other wheels W1, W3 and W4 do not respond to the oil pressure fluctuations of the wheel cylinder WCfr. Therefore, the controller 70 associates the wheel cylinder WCfr, at which the W/C oil pressure fluctuation is generated, with the wheel W2, which responds to the W/C oil pressure fluctuation at the wheel cylinder WCfr. The controller 70 then identifies the wheel position of the second wheel W2. Therefore, the first and second wheels W1, W2 are identified as the front-left wheel WCfl and the front-right wheel WCfr, respectively.

In step 412, the controller 70 allocates the front-left wheel position of the wheel cylinder WCfl and the front-right wheel position of the wheel cylinder WCfr as the wheel positions of the first and second wheels W1 and W2, respectively. Thereafter, the program proceeds to step 414 so as to temporally terminate the front wheel position identification sub-routine.

On occasions where no response is detected relative to the W/C oil pressure fluctuation generated in response to a braking requirement by a driver at this time, the front wheel position identification control may be implemented at the next braking requirement by a driver.

As described above, the W/C oil pressure fluctuation in the front wheel position process is produced by use of oil pressure generated by the brake actuator C at a time of stepping on the brake pedal 11. Therefore, a disc brake, which is a highly-responsive and well-controlled brake system, is appropriate in this case.

After terminating the front wheel position identification sub-routine, the program proceeds to step 108 in FIG. 4. In step 108, the controller 70 executes a rear wheel position identification sub-routine for identifying wheels placed at the rear wheel positions. More specifically, the controller 70 judges in step 802 whether the wheels located at the rear of the vehicle M are to be identified at every cycle where the rear wheel position identification sub-routine is initiated in step 800 in FIG. 11.

Figure 12:
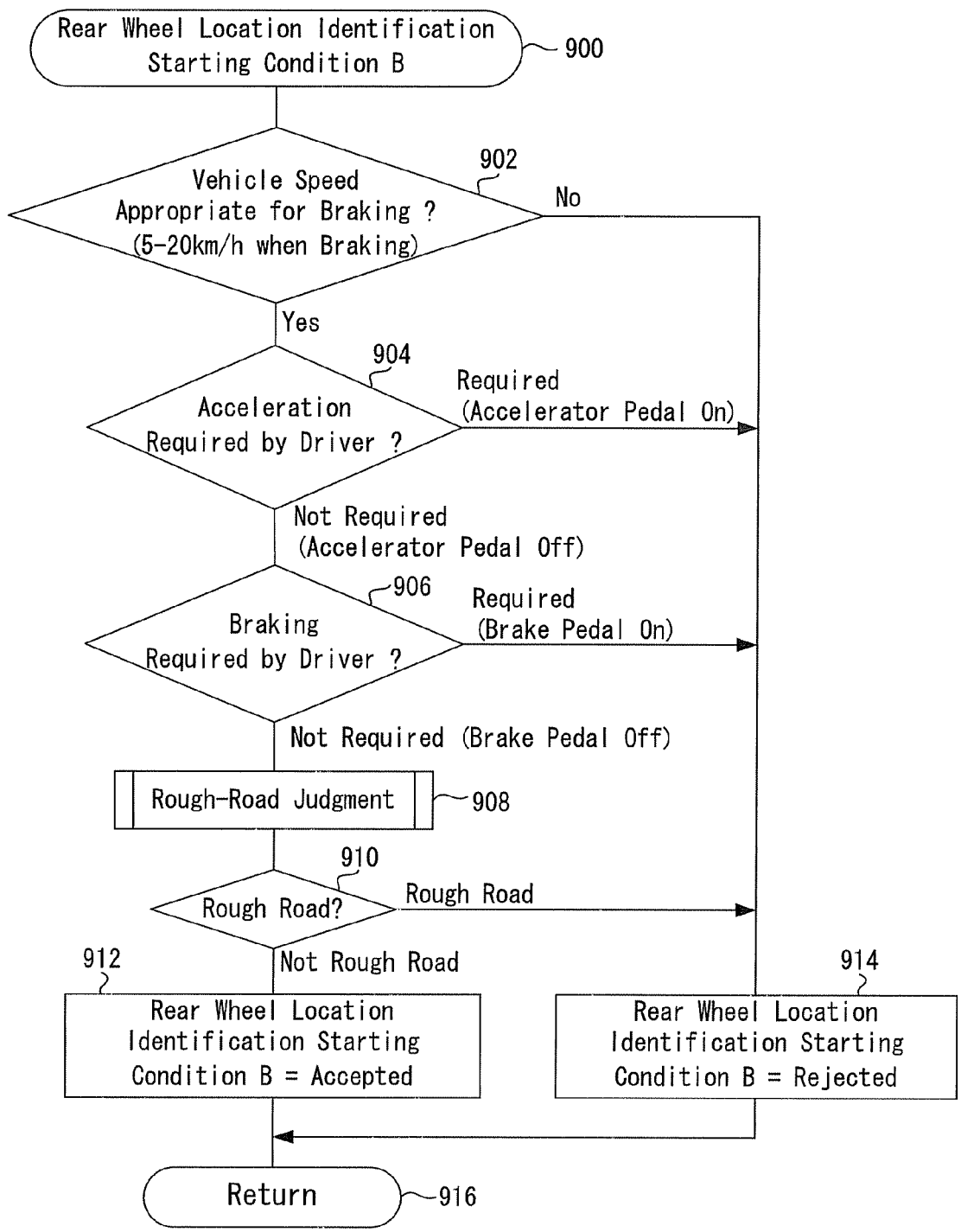
FIG. 12 is a flowchart for explaining a sub-routine for judging a rear wheel position identification starting condition B implemented by the controller illustrated in FIG. 2.

In step 802, the controller 70 implements a sub-routine to judge a rear wheel position identification starting condition B in FIG. 12. More specifically, the controller 70 judges (steps 902-910) whether a current condition is satisfied to change a level of oil pressure applied to at least one of the wheel cylinders WCfl-WCrr at every cycle where the sub-routine in FIG. 12 is initialized in step 900.

In step 902, the controller 70 judges the operation of the brake pedal 11 by the driver is implemented when the vehicle M is running at a speed appropriate for depressing the brake pedal 11. The controller 70 calculates the speed of the vehicle M based upon speeds of wheels outputted from the wheel speed sensors SBfl-SBrr. When an actual vehicle speed falls within a predetermined speed range, such as 5-20 km/h, the controller 70 judges that the operation of the brake pedal 11 by the driver is implemented when the vehicle M is running at a speed appropriate for depressing the brake pedal 11. If not so, the controller 70 judges that the vehicle M is not running at a speed appropriate for depressing the brake pedal 11. As described above, the controller 70 can recognize whether the speed of the vehicle M at a time of braking by the driver is appropriate, in order to implement the rear wheel position identification control.

In step 904, the controller 70 judges whether a driver requires accelerating the vehicle M. Specifically, the controller 70 judges a presence, or an absence, of stepping on the accelerator pedal 15, based upon an operation amount of the accelerator pedal 15 detected by the acceleration sensor 15a. When the accelerator pedal 15 is depressed, the controller 70 judges the presence of requirement for accelerating the vehicle M. On the other hand, when the accelerator pedal 15 is not depressed, the controller 70 judges the absence of requirement for accelerating the vehicle M. When the driver requires accelerating the vehicle M, a braking operation for implementing the rear wheel position identification control is not allowed. When the driver does not require accelerating the vehicle M, a braking operation for implementing the rear wheel position identification control is allowed.

In step 906, the controller 70 judges a presence, or an absence, of a braking requirement by a driver, in the same manner as step 502. When the controller 70 confirms a presence of a braking requirement by a driver, an automatic braking control for implementing the rear wheel position identification control is not allowed. On the other hand, when the controller 70 confirms an absence of a braking requirement by a driver, the automatic braking control for the rear wheel position identification control is allowed.

In step 908, the controller 70 judges whether a road surface, on which the vehicle M is actually running, is a rough road, in the same manner as step 510. In step 910, the controller 70 judges whether the vehicle M is running on a rough road, in the same manner as step 512.

When a negative answer "No" is obtained in any of steps 902-904, when the controller 70 judges in step 906 "Not Required" in step 906, or when the controller 70 judges in step 910 "Rough Road", the controller 70 judges that a rear wheel position identification process is not allowed to start. In other words, the controller 70 determines that a judgment of a presence, or an absence, of the wheel rotational speed fluctuation, which occurs due to the W/C oil pressure fluctuation, is not allowed to start. In step 914, the rear wheel position identification starting condition B is rejected. The program then proceeds to step 916 and the sub-routine in FIG. 12 is temporarily terminated. On the other hand, when an affirmative answer "Yes" is obtained in any of steps 902-908 and when the controller 70 judges in step 910 "Not Rough Road", the controller 70 determines that a rear wheel position identification process is allowed to start. In step 912, the rear wheel position identification starting condition B is accepted. The program then proceeds to step 916 so as to temporarily terminate the sub-routine in FIG. 12.

Figure 11:
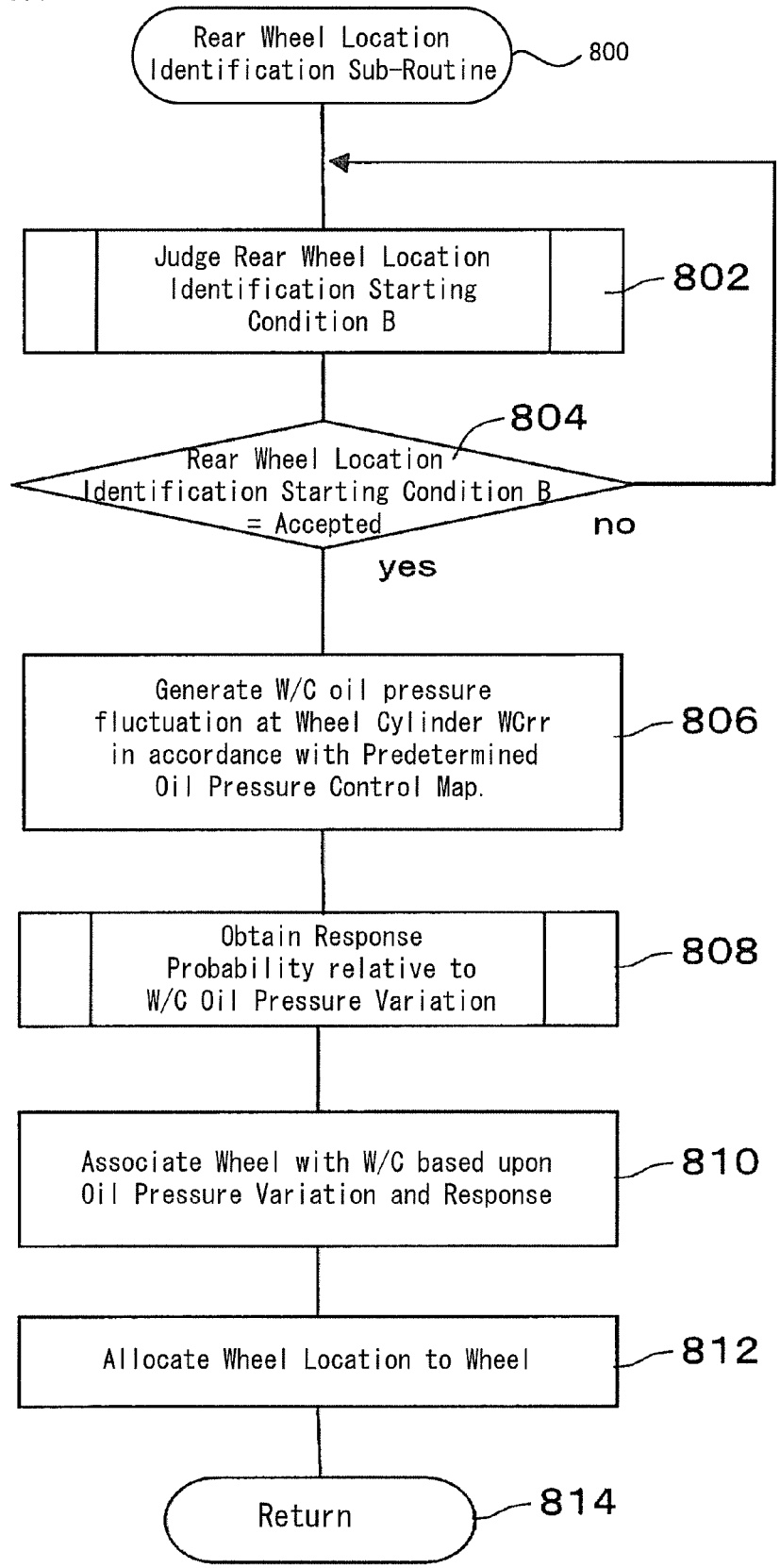
FIG. 11 is a flowchart for explaining a sub-routine for identifying a rear wheel position implemented by the controller illustrated in FIG. 2.

The program then returns to step 804 in FIG. 11 after terminating the sub-routine for judging the rear wheel position identification starting condition B. When the rear wheel position identification starting condition B is rejected, a negative answer "No" is obtained in step 804, the program returns to step 802, and steps 802 and 804 are repeatedly executed until the rear wheel position identification starting condition B is accepted. On the other hand, when the rear wheel position identification starting condition B is accepted, an affirmative answer "Yes" is obtained in step 804 so as to implement the rear wheel position identification control.

Figure 15:
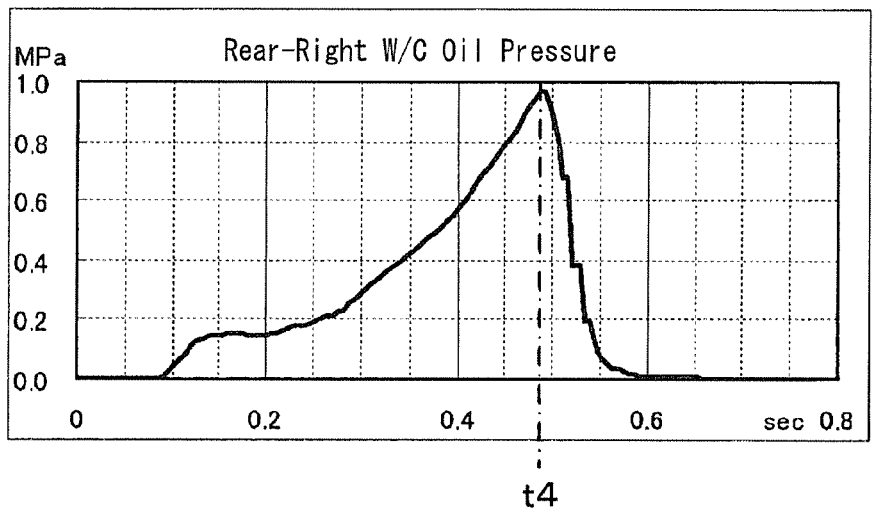
FIG. 15 is a timechart for explaining a W/C oil pressure fluctuation at a rear-right wheel cylinder.

In step 806, the controller 70 generates the W/C oil pressure fluctuation at least one of the wheel cylinders WCrl, WCrr, which both have not been associated with any wheels. According to the embodiment, the W/C oil pressure fluctuation is generated at least either the wheel cylinder WCrl or WCrr. More specifically, when the controller 70 judges that the rear wheel position identification starting condition B is accepted (time t4 in FIG. 15), the controller 70 generates automatically the W/C oil pressure fluctuation only at the wheel cylinder WCrr mounted at the rear-right of the vehicle M in accordance with a predetermined oil pressure control map. In this case, the W/C oil pressure fluctuation is generated regardless of the operation at the brake pedal 11. The oil pressure control map, which is employed in these circumstances, is designed in a manner that oil pressure applied to the wheel cylinder gradually increases at a predetermined increasing rate and then reduces rapidly after reaching a predetermined oil pressure level, as illustrated in FIG. 15. Further, the oil pressure control map is designed so that the oil pressure fluctuation, whenever the oil pressure is increasing or decreasing, does not create an uncomfortable feeling to an occupant, and so that the controller 70 can detect the wheel rotational speed fluctuation (response) while the oil pressure is decreasing. For example, the maximum increasing rate of the oil pressure is 0.2/0.05 (Mpa/sec), the maximum oil pressure level is 1.0 Mpa, and the decreasing rate of the oil pressure is −0.8/0.05 (Mpa/sec). Time t4 in FIG. 15 is a time point where sudden reduction in oil pressure is started.

As described above, it is possible to identify the position of each wheel by automatically applying braking force to the vehicle M while restraining an occurrence of the possible uncomfortable feeling to a driver. A drum brake is not well responsive to the W/C oil pressure fluctuation generated by increasing oil pressure supplied to the wheel cylinder. Therefore, when the drum brake is employed, a presence, or an absence, of a response relative to the W/C oil pressure fluctuation may not be detected accurately and precisely. However, the drum brake is well responsive to the W/C oil pressure fluctuation generated by decreasing oil pressure supplied to the wheel cylinder. Therefore, even when the wheel is mounted with a drum brake, a presence, or an absence, of a response relative to the W/C oil pressure fluctuation due to reduction in oil pressure is detected, thereby identifying the position of each wheel accurately and precisely.

Through steps 808, 810 and 812 of the flowchart in FIG. 11, the controller 70 verifies the W/C oil pressure fluctuation at each wheel cylinder WCrl, WCrr and responses each responsive to the W/C oil pressure fluctuation at each wheel cylinder and obtained based upon the rotation state signal (acceleration signal) outputted from each rotation state sensor SW1-SW4. As a result, the controller 70 identifies the wheel position of each third and fourth wheel W3, W4. Specifically, in step 808, the controller 70 obtains or recognizes a presence, or an absence, of a response of each wheel W1, W2, W3 and W4 relative to the W/C oil pressure fluctuation at each wheel cylinder WCrl, WCrr. In step 810, the controller 70 associates each wheel from among the wheels W1-W4 with each wheel cylinder from among the wheel cylinders WCfl-WCrr respectively based upon a presence, or an absence, of the W/C oil pressure fluctuation at each wheel cylinder WCrl, WCrr and a response obtained from each wheel. In Step 812, the controller 70 allocates the position of the wheel cylinder, to which each wheel is associated respectively, as the position of each wheel.

In step 808, the controller 70 obtains a presence, or an absence, of a response of each wheel W1, W2, W3 and W4 relative to the W/C oil pressure fluctuation at each wheel cylinder WCrl, WCrr. For example, when a third rotational fluctuation V3 of the third wheel W3 appears as illustrated in FIG. 17, the controller 70 obtains "Without Response" which represents an absence of the wheel rotational speed fluctuation of the third wheel W3. When a fourth rotational fluctuation V4 of the fourth wheel W4 appears as illustrated in FIG. 16, the controller 70 obtains "With Response" which represents a presence of the wheel rotational speed fluctuation of the fourth wheel W4 at time t14 that is a predetermined period post-time point from time t4. The controller 70 obtains "Without Response" which represents an absence of the wheel rotational speed fluctuations of the first and second wheels W1, W2. Because the positions of the first and second wheels W1 and W2 have been already identified at step 106 described above, the wheels W1 and W2 may be omitted from an object applied with the rear wheel position identification control.

In step 810, the controller 70 associates each wheel from among the wheels W1-W4 with each wheel cylinder from among the wheel cylinders WCfl-WCrr respectively based upon a presence, or an absence, of W/C oil pressure fluctuation at each wheel cylinder WCrl, WCrr and a response obtained from each wheel. Here, Especially the wheel cylinder WCrr mounted at the rear-right position of the vehicle M is associated with each wheel W1-W4.

As illustrated in FIGS. 15 and 16, only the fourth wheel W4, at which the wheel rotational speed fluctuation occurs at time t14, responds to the W/C oil pressure fluctuation at the wheel cylinder WCrr generated at time t4, and the other wheels W1, W2 and W3 do not respond to the W/C oil pressure fluctuation of the wheel cylinder WCrr generated at time t4. Therefore, the controller 70 associates the wheel cylinder WCrr, at which the W/C oil pressure fluctuation is generated, with the fourth wheel W4, and identifies the wheel position of the fourth wheel W4. Further, the controller 70 does not obtain the wheel rotational speed fluctuation of the third wheel W3, and the positions of the first and second wheels W1, W2 have been already identified. Therefore, the controller 70 associates the wheel cylinder WCrl, at which no W/C oil pressure fluctuation is generated, with the third wheel W3, at which no wheel rotational speed fluctuation is attributed to the W/C oil pressure fluctuation. As a result, the controller 70 identifies the position of the third wheel W3, and hence identifies the third and fourth wheels W3 and W4 as the rear-left wheel WCrl and the rear-right wheel WCrr.

In Step 812, the controller 70 allocates the rear-left position, which is the wheel position of the wheel cylinder WCrl, as the wheel position of the wheel W3 and allocates the rear-right position, which is the wheel position of the wheel cylinder WCrr, as the wheel position of the wheel W4. Thereafter, the program proceeds to step 814 so that the rear wheel position identification sub-routine is temporally terminated. The program then proceeds to step 10 in FIG. 4 and the process for identifying the wheel position is terminated.

The controller 70 may implement the rear wheel position identification when a driver requires a braking operation. In this case, the controller 70 can judge a presence, or an absence, of a braking requirement by a driver prior to executing step 902 in FIG. 12. In this case, in order to implement the rear wheel position identification, it is required that 1) the vehicle M is running at an appropriate speed (5-20 km/h) at a time of braking by the driver ("Yes" in step 902); 2) the driver does not require to accelerate the vehicle M ("Not Required" in step 904); and 3) a road, on which the vehicle is running, is not a rough road ("Not Rough Road" in step 910). Here, the judgment in step 906 is omitted.

On occasions where no response is detected relative to the W/C oil pressure fluctuation generated by an automatic braking operation at this time, the wheel position identification control may be implemented when a braking requirement is next placed. Here, it is preferable that an oil pressure control map, which is employed for the next wheel position identification control, includes the maximum oil pressure level higher than the one included in the oil pressure control map employed this time. There may be a possibility that a driver may obtain an uncomfortable feeling due to the W/C oil pressure fluctuation. However, because reduction in the wheel rotational speed fluctuation due to the shortage of the oil pressure is prevented, a response relative to the W/C oil pressure fluctuation is reliably detected.

According to the embodiment described above, in order to generate the W/C oil pressure fluctuation for the rear wheel position identification, the oil pressure is automatically generated based upon a predetermined oil pressure control map and regardless of depressing at the brake pedal 11 by a driver. Therefore, not only a disc brake, which is a highly-responsive and well-controlled brake system, but also a brake drum, which is inferior in response and controllability to such disc brake, are appropriate in this case.

As is apparent from the above, according to the embodiment, the vehicle M is equipped with a plurality of wheel cylinders WCfl-WCrr (corresponding to braking force-applying means) fixed at a body of the vehicle M and respectively and in advance associated with wheel positions of wheels W1-W4 to be mounted on the vehicle M. In the controller 70, braking force fluctuation generating means (step 406 or 806) generates W/C oil pressure fluctuation (corresponding to braking force fluctuation) to at least one of the wheels with a time deviation separately or one-by-one by controlling at least one of the wheel cylinders WCfl-WCrr. Response probability obtaining means (Steps 408, 808) obtains a presence, or an absence, of a response of the at least one of the wheels W1-W4 relative to the W/C oil pressure fluctuation (the braking force fluctuation) based upon a wheel rotational speed fluctuation of the at least one of the wheels. The wheel rotational speed fluctuation is obtained from each rotation state sensor SW1-SW4. Associating means (steps 410, 810) associates the at least one of the wheels (W1-W4) with the at least one of the wheel cylinder WCfl-WCrr (braking force-applying means) respectively based upon a combination of a presence, or an absence, of the W/C oil pressure fluctuation at each wheel cylinder WCfl-WCrr (a presence, or an absence of the braking force fluctuation at each braking force-applying means) and the presence, or the absence, of the response obtained by the response probability obtaining means. In other words, the wheel cylinder, at which the W/C oil pressure fluctuation is generated, is respectively associated with the wheel that responds thereto. Accordingly, it is possible to identify the wheel positions of the first-fourth wheels W1-W4 with reliability and in a short period of time based upon only detection results of the rotation state sensors SW1-SW4 provided at the wheel. That is, there is no need to employ detection results of wheel speed sensors provided at the vehicle body, which have been conventionally employed. Moreover, it is possible to identify the wheel positions of the first-fourth wheels W1-W4 without difficulty and in a short period of time.

Further, the controller 70 controls at least one of the wheel cylinders WCrl-WCrr (at least one of the braking force-applying means, only the WCrr according to the embodiment) to generate the W/C oil pressure fluctuation (the braking force fluctuation) in a manner that an amount of braking force applied by the at least one of the wheel cylinders (the at least one of the braking force-applying means) gradually increases at a predetermined increasing rate and reduces rapidly after reaching a predetermined braking force level (step 806). In this case, an amount of pressure is relatively smoothly increased, thereby preventing an occurrence of braking shock. Therefore, it is possible to identify the wheel position of the wheel W1-W4 (only the WCrr according to the embodiment) by automatically applying braking force to the vehicle M while restraining an occurrence of the possible uncomfortable feeling to a driver. In a drum brake, which does not respond well at a time of pressure increasing, a wheel rotational speed fluctuation may not readily arise from a W/C oil pressure fluctuation. However, it is possible to detect a wheel rotational speed fluctuation, which arises from a W/C oil pressure fluctuation created by a reduction in an amount of braking force due to a sudden reduction in oil pressure. Therefore, the wheel position of the wheel is identified reliably and accurately even when a drum brake is employed.

Still further, when starting a braking of the vehicle M, the braking force fluctuation, which corresponds to an increase in an amount of braking force to be applied to the vehicle M, is generated at the wheel cylinders (braking force-applying means) at different timings. Therefore, a driver does not have to erroneously feel such increase in an amount of braking force for example when depressing the brake pedal 11, increasing a depressing amount of the brake pedal 11, or braking due to an engine brake. As a result, it is possible to identify the position of the wheel without uncomfortable feeling obtained by the driver.

Still further, stopping means (steps 510, 512, 516, 908, 910, 914) stops a series of braking force fluctuation generating means (step 406 or 806), response probability obtaining means (step 408 or 808) and associating means (step 410 or 810) when the vehicle M is running on a rough road. Therefore, a response relative to a W/C oil pressure fluctuation (braking force fluctuation) is reliably prevented from being obtained erroneously, which leads to reliably restraining an erroneous identification of the wheel position of the wheel.

Still further, level learning means (steps 202-210) learns a level of a fluctuation of a rotational speed of the wheel, which fluctuation is derived from a fluctuated rotation of the wheel. The judgment threshold value is changed in response to the learning results. Judging means (step 704) judges a presence of a response relative to the braking force fluctuation when the rotational speed fluctuation of the wheel is greater than, or equal to, the judgment threshold value. Therefore, for example when a wheel is unbalanced due to aging, it is possible to reliably obtain a response relative to a W/C oil pressure fluctuation (braking force fluctuation), thereby reliably identifying a wheel position of the wheel.

Still further, according to the embodiment, mounted on the vehicle M are the front wheels each employing a disc brake and the rear wheels each employing a drum brake. W/C oil pressure is generated to the front wheels with a time deviation therebetween when the brake pedal 11 is depressed. W/C oil pressure is generated to the rear wheels with a time deviation therebetween and automatically based upon a predetermined oil pressure control map regardless of the brake pedal-depressing operation of the brake pedal 11. When all of the four wheels are each applied with a disc brake, it is preferable that W/C oil pressure is generated to each four wheel with a time deviation therebetween when the brake pedal 11 is depressed, and that a process similar to the above-described front-wheel identification is implemented. Meanwhile, when all of the four wheels are each applied with a drum brake, it is preferable that W/C oil pressure is generated to each four wheel with a time deviation therebetween and automatically based upon a predetermined oil pressure control map regardless of the brake pedal-depressing operation of the brake pedal 11.

Still further, a structure of the hydraulic brake system B is not limited to the above, and another structure thereof can be employed as far as the system supplies base hydraulic pressure, which is responsive to the brake pedal-depressed state of the brake pedal 11, to the wheel cylinder, and supplies controlled hydraulic pressure to each wheel cylinder. The controlled hydraulic pressure does not correspond to the brake pedal-depressed state of the brake pedal 11 and is supplied to each wheel cylinder independently.

Still further, according to the embodiment, the controller judges a presence, or an absence, of a wheel rotational speed fluctuation by comparing the gain S with the judgment threshold value. The gain S is a square of a rotational angular acceleration of each wheel or the sum of squares of rotational angular accelerations of each wheel for a predetermined period of time. Alternatively, a presence, or an absence, of a wheel rotational speed fluctuation can be judged by comparing the judgment threshold value with an absolute value of a rotational angular acceleration or with the sum of absolute values for a predetermined period of time.

Still further, according to the embodiment, the W/C oil pressure fluctuation to each wheel cylinder WCrl, WCrr is generated based upon the oil pressure control map when there is no braking requirement by a driver. However, the W/C oil pressure fluctuation can be generated when there is a braking requirement of a driver. In this case, because the W/C oil pressure fluctuation is generated to each wheel cylinder WCrl, WCrr when a driver depresses the brake pedal 11, an uncomfortable feeling applied to the driver upon depressing the brake pedal 11 is furthermore restrained. In this case, on occasions where a braking requirement of the driver continues even when the W/C oil pressure is suddenly reduced and drawn out, it is preferable that the W/C oil pressure temporarily drawn out is again supplied to the wheel cylinder so as to increase the W/C oil pressure. As a result, it is possible to apply an appropriate amount of braking force to the vehicle M.

Still further, according to the embodiment, the W/C oil pressure fluctuation can be generated to the wheel cylinder as follows. According to the embodiment described above, during the rear wheel position identification, the W/C oil pressure fluctuation is generated automatically based upon the predetermined oil pressure control map even when there is no braking requirement of a driver. However, the controller 70 may control at least one of the braking force-applying means to generate the braking force fluctuation so as to temporally reduce an amount of braking force applied by the at least one of the braking force-applying means while the braking force is being applied to the vehicle M, i.e., while a driver is depressing the brake pedal 11.

In this case, the controller 70 judges that the rear wheel position identification starting condition B is accepted when the following four conditions are satisfied in step 802: 1) there is a braking requirement of the driver; 2) braking control by the brake actuator C, such as an ABS control, an ESC control, and driving control are each in an inactive mode; 3) an actual current braking force falls within a range of the braking force that is effective for judgment; and 4) the vehicle M is not running on a rough road. If any of the four conditions is not satisfied, the controller 70 judges that the rear wheel position identification starting condition B is rejected. Thereafter, instead of step 806, the controller 70 temporarily reduces an oil pressure being applied only to the wheel cylinder WCrr mounted at the rear-right position when the controller 70 judges that the rear wheel position identification starting condition B is accepted during a braking operation to the vehicle M (t8 in FIG. 20). As a result, the W/C oil pressure fluctuation is generated at the wheel cylinder WCrr.

Figure 20:
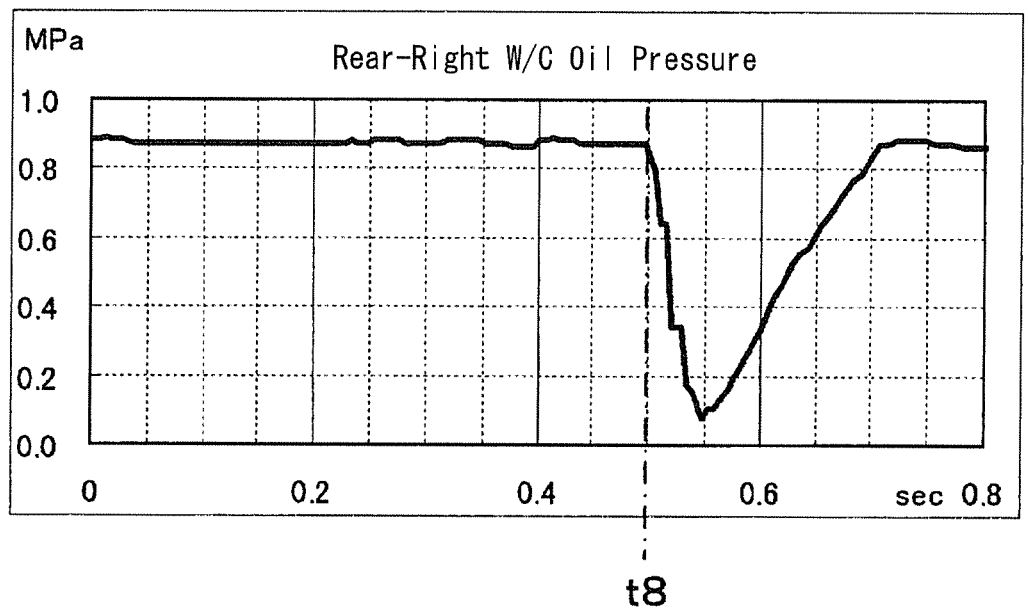
FIG. 20 is a timechart (oil pressure control map) for explaining a W/C oil pressure fluctuation of a rear-right wheel cylinder.

In this case, the oil pressure can be temporally reduced automatically based upon a predetermined oil pressure control map as illustrated in FIG. 20. This oil pressure control map is designed in a manner that an oil pressure is gradually increased at a predetermined increasing rate after being rapidly reduced and reaching a predetermined oil pressure level. The W/C oil pressure fluctuation in accordance with this map is designed so that an occupant doe not obtain an uncomfortable braking feeling whichever the fluctuation results from an increase or decrease in oil pressure. Further, the W/C oil pressure fluctuation in accordance with this map is designed to be detected as a wheel rotational speed fluctuation when an oil pressure reduces. For example, the decreasing rate of the oil pressure is −0.8/0.05 (Mpa/sec), the minimum oil pressure is 0.1 Mpa, and the increasing rate of the oil pressure is 0.8/0.15 (Mpa/sec). T8 in FIG. 20 is a time point where the oil pressure is suddenly reduced. The oil pressure reduction can be resulted from switching the solenoid valve 54 from the closed state to the open state.

Figure 21:
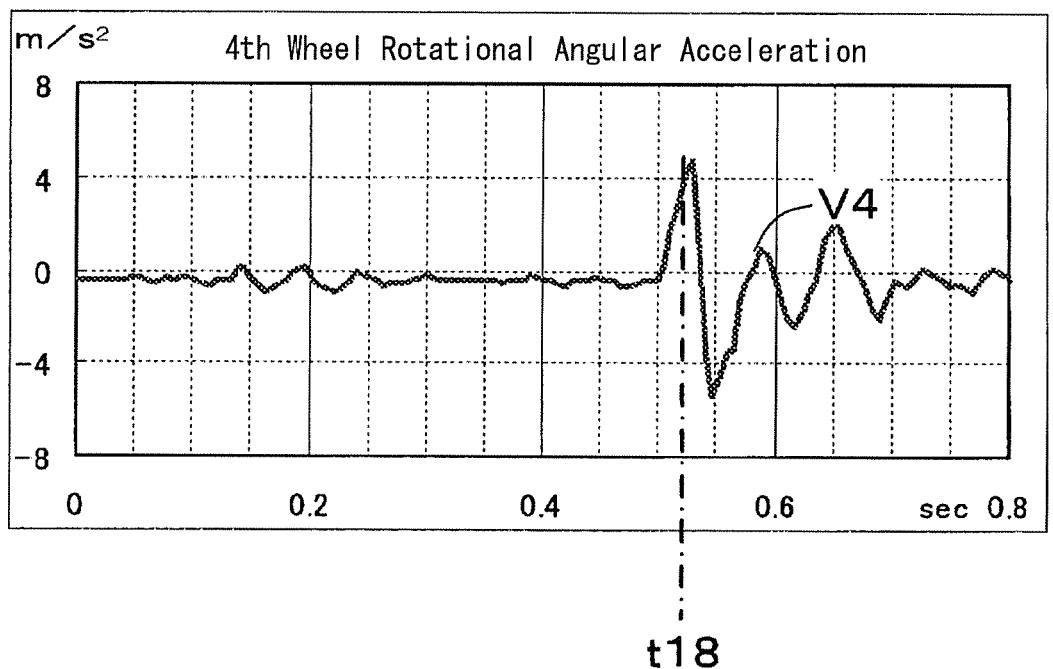
FIG. 21 is a timechart for explaining the wheel rotational speed fluctuation of the fourth wheel.

As a result of the aforementioned W/C oil pressure fluctuation, when the fourth wheel rotational speed fluctuation V4 of the fourth wheel W4 appears as illustrated in FIG. 21 for example, the controller 70 judges "With Response" and recognizes a presence of the wheel rotational speed fluctuation of the fourth wheel W4 at t18 that is a predetermined period post-time point from t8. Further, the controller 70 judges "Without Response" and recognizes an absence of the wheel rotational speed fluctuation of the third wheel W3. Therefore, during the braking operation to the vehicle M, it is possible to identify the position of the wheel by automatically applying the W/C oil pressure fluctuation (braking force fluctuation) while restraining an occurrence of the possible uncomfortable feeling to a driver.

According to the embodiment described above, the W/C oil pressure fluctuation may be generated to the wheel cylinder as follows. According to the embodiment, during the front wheel position identification, the oil pressure is controlled when braking to the vehicle M is started. Alternatively, braking force fluctuation, which corresponds to a reduction in an amount of braking force to be applied to the vehicle M, may be generated at each wheel cylinder (braking force applying means) with a time deviation when releasing braking of the vehicle M. In this case, the controller 70 judges that the front wheel position identification starting condition A is accepted when the following two conditions are satisfied in step 402: 1) there is a braking-release requirement; and 2) the vehicle M is not running on a rough road. If not so, the controller 70 judges that the front wheel position identification starting condition is rejected. Thereafter, instead of the process in step 406 in FIG. 7, oil pressure is reduced only to the wheel cylinder WCfl mounted at the front-left position when braking to the vehicle M is released, e.g., simultaneously when a braking requirement is terminated, i.e., simultaneously when depressing against the brake pedal 11 is terminated (time t5 in FIG. 18A).

Figure 18A:
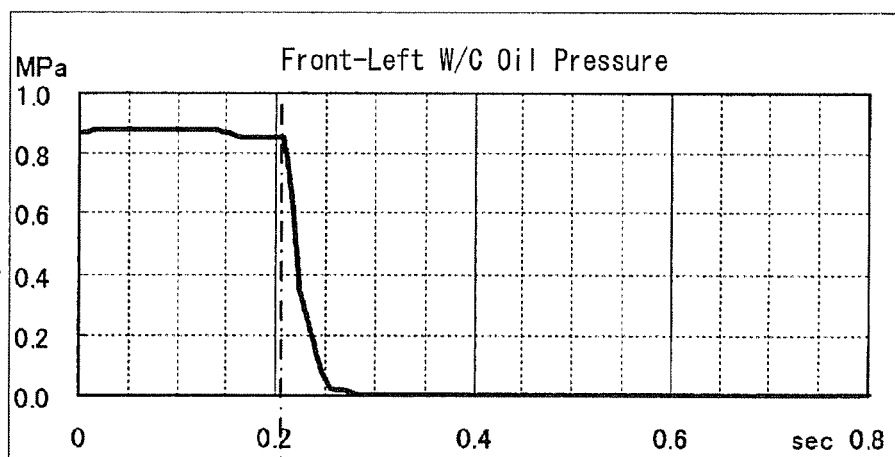
FIG. 18A is a timechart for explaining a modified example of the W/C oil pressure fluctuation at the front-left wheel cylinder.
Figure 18B:
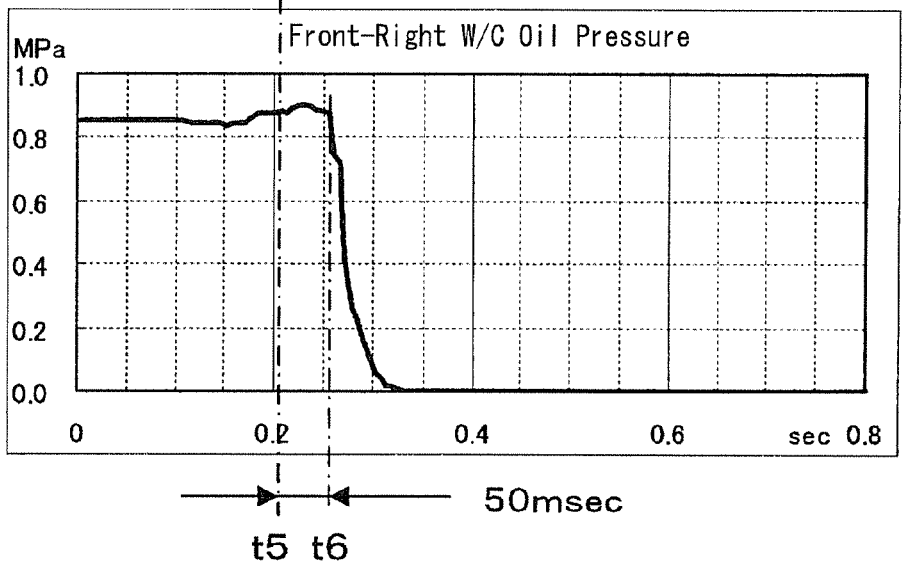
FIG. 18B is a timechart for explaining a modified example of the W/C oil pressure fluctuation at the front-right wheel cylinder.

The controller 70 then starts reducing a level of oil pressure being applied to the wheel cylinder WCfr mounted at the front-right position with a time deviation from the start of the W/C oil pressure fluctuation at the wheel cylinder WCfl. For example, the controller 70 reduces oil pressure supplied to the wheel cylinder WCfr at a time point (time t6 in FIG. 18B) that is a predetermined short time post-time point from time t5 (e.g., 50 msec). The W/C oil pressure fluctuations at both wheel cylinders WCfl, WCfr are depicted in FIGS. 18A and 18B, respectively. Thereafter, the controller 70 reduces oil pressure supplied to each wheel cylinder WCrl, WCrr, with a time deviation from the start of generating the W/C oil pressure fluctuation at the wheel cylinder WCfr. For example, oil pressure supplied to each wheel cylinder WCrl, WCrr may be reduced at a time point that is a predetermined short time post-time point from t5 (e.g., 80 msec).

Figure 19A:
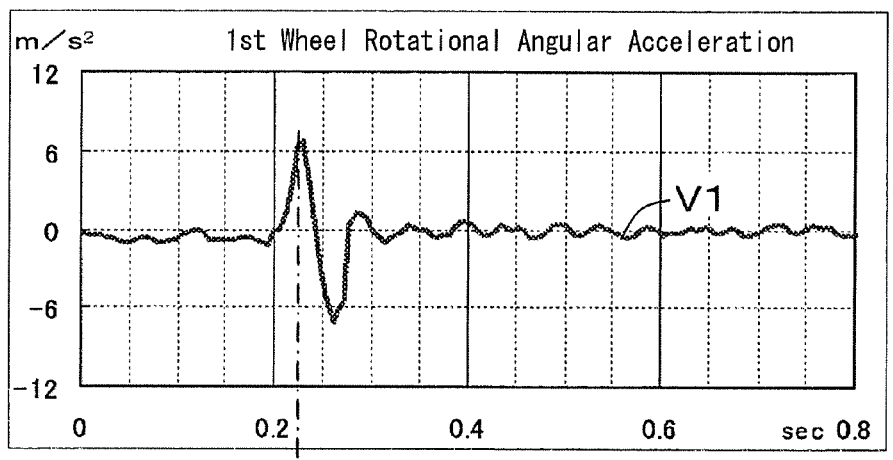
FIG. 19A is a timechart for explaining the first wheel rotational speed fluctuation of the first wheel.
Figure 19B:
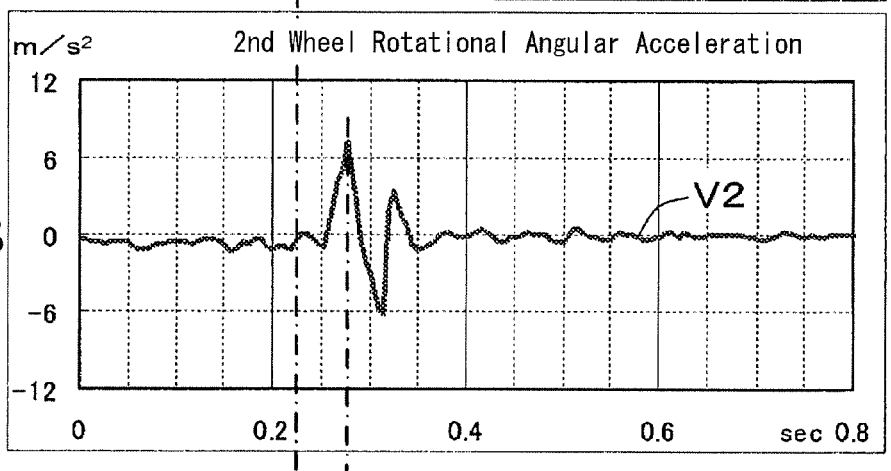
FIG. 19B is a timechart for explaining the second wheel rotational speed fluctuation of the second wheel.

For example, when the first wheel rotational speed fluctuation V1 of the first wheel W1 appears as illustrated in FIG. 19A, the controller 70 obtains "With Response" which represents a presence of the wheel rotational speed fluctuation of the first wheel W1 at time t15 that is a predetermined period post-time point from time t5. When the second wheel rotational speed fluctuation V2 of the second wheel W2 appears as illustrated in FIG. 19B, the controller 70 obtains "With Response" which represents a presence of the wheel rotational speed fluctuation of the second wheel W2 at time t16 that is a predetermined period post-time point from time t6. A time gap between time 15 and time 16 is substantially equal to the time gap (50 msec) defined to generate the W/C oil pressure fluctuation at the wheel cylinder WCfr.

Accordingly, a driver does not have to erroneously feel such reduction in an amount of braking force for example when releasing a depressing operation against the brake pedal 11. As a result, it is possible to identify the position of the wheel without uncomfortable feeling obtained by the driver.

According to the embodiment described above, the wheel position of the wheel is identified based upon the W/C oil pressure variation generated separately or one-by-one at the wheel cylinder with a time deviation. Alternatively, the wheel position of each wheel may be identified by generating the W/C oil pressure fluctuations simultaneously at any two wheel cylinders from among the four wheel cylinders. In this case, brake systems for four wheels may be determined to be identical, for example disc brakes.

Instead of executing step 406 in FIG. 7, the controller 70 pressurizes any two wheels at a time of a braking operation by a driver and pressurizes the other two wheels with a time delay relative to pressurizing the first two wheels. More specifically, the controller 70 first controls any two wheel cylinders among from the four wheel cylinders to simultaneously generate the W/C oil pressure fluctuations and secondly controls one of the two wheel cylinders, which are first controlled to generate the W/C oil pressure fluctuations, and one of the other two wheel cylinders, which are not first controlled to generate the W/C oil pressure fluctuations, to simultaneously generate the W/C oil pressure fluctuations. Further, instead of executing step 410 in FIG. 7, the controller 70 associates each wheel with each wheel cylinder respectively based upon a combination of the wheel cylinder, which generates the W/C oil pressure fluctuation, and the wheel which responds to the W/C oil pressure fluctuation and a combination of the wheel cylinder, which does not generate the W/C oil pressure fluctuation, and the wheel which does not respond to the W/C oil pressure fluctuation. Each combination is defined in response to generation of the W/C oil pressure fluctuations first and secondly. The controller 70 then allocates the wheel position of each wheel cylinder as the wheel position of each wheel based upon the association results.

For example, the controller 70 first controls the front (or rear) two wheel cylinders WCfl, WCfr (or WCrl, WCrr) to generate the W/C oil pressure fluctuations. The controller 70 then obtains "With Response" and recognizes that the wheel rotational speed fluctuations are generated substantially simultaneously at the first and second wheels W1 and W2. The controller 70 also obtains "Without Response" and recognizes that no wheel rotational speed fluctuation is generated at the first and fourth wheels W3, W4. As a result, the first and second wheels W1, W2 are each associated with the front two wheels Wfl, Wfr, and the third and fourth wheels W3, W4 are each associated with the rear two wheels Wrl, Wrr.

Secondly, the controller 70 controls the left (or right) two wheel cylinders WCfl WCrl (or WCfr, WCrr) to generate the W/C oil pressure fluctuations. The controller 70 then obtains "With Response" and recognizes that the wheel rotational speed fluctuations are generated substantially simultaneously at the first and third wheels W1, W3. The controller 70 also obtains "Without Response" and recognizes that no wheel rotational speed fluctuation is generated at the second and fourth wheels W2, W4. As a result, the first and third wheels W1, W3 are each associated with the left two wheels Wfl, Wrl, and the second and fourth wheels W2, W4 are each associated with the right wheels Wfr, Wrr.

The controller 70 then identifies the wheel position of each wheel based upon the results of the first and second associations. The first and second wheels W1, W2 are each associated with the front wheels Wfl, Wfr, and the first and third wheels W1, W3 are each associated with the left wheels Wfl, Wrl. As a result, the first wheel W1 is identified as the front-left wheel Wfl. In the same manner, the second wheel W2, the third wheel W3 and the fourth wheel W4 are identified as the front-right wheel Wfr, the rear-left wheel Wrl and the rear-right wheel WIT, respectively.

In this case, it is possible to identify the wheel positions of the wheels by generating the W/C oil pressure fluctuations only twice. In this case, braking force fluctuates not every single wheel but every two wheels, thereby identifying the wheel positions of the wheels while assuring a stability of the vehicle M. When the positions of the wheels are identified by generating the W/C oil pressure fluctuation every single wheel, the W/C oil pressure fluctuations need to be generated three times. Meanwhile, it is possible to identify the wheel positions of the wheels by generating the W/C oil pressure fluctuations only twice. In this case, the positions of the wheels can be identified in an abbreviated period of time.

Further, it is possible to identify the wheel position of the wheel by generating the W/C oil pressure fluctuations simultaneously to every three wheel-cylinders from among the four wheel-cylinders until the wheel position is identified. In this case, brake systems for the four wheels may be determined to be identical, for example disc brakes. Instead of executing step 406 in FIG. 7, the controller 70 pressurizes any three wheels simultaneously at a time of a braking requirement of a driver and pressurizes the other wheel with a time delay relative to pressurizing the first three wheels. Further, instead of executing step 410 in FIG. 7, the controller 70 associates the wheel cylinder, which is not first controlled to generate the W/C oil pressure fluctuation, with the wheel that does not respond. The controller 70 then allocate the wheel position of the wheel cylinder, which is not controlled to generate the W/C oil pressure fluctuation, as the wheel position of the wheel, of which rotational speed does not fluctuate.

For example, the controller 70 first controls the three wheel cylinders WCfr, WCrl and WCrr to generate the W/C oil pressure fluctuations simultaneously. The controller 70 then obtains "With Response" and recognizes that the wheel rotational speed fluctuations are generated substantially simultaneously at the second-four wheels W2-W4 at a time point corresponding to a time where the W/C oil pressure fluctuations are first generated. The controller 70 also obtains "Without Response" and recognizes that no wheel rotational speed fluctuation is generated at the first wheel W1. As a result, the first wheels W1, which does not respond, is associated with the wheel cylinder WCfl which is not controlled to generate the W/C oil pressure fluctuation. In the same manner, the second-fourth wheels W2-W4 are each associated with the wheel cylinders WCfr, WCrl and WCrr, respectively.

In this case, the braking force fluctuation is generated not at every single wheel nor at every two wheels but at every three wheels. Therefore, it is possible to identify the wheel positions of the wheels while assuring a stability of the vehicle M at an earlier stage.

Figure 22:
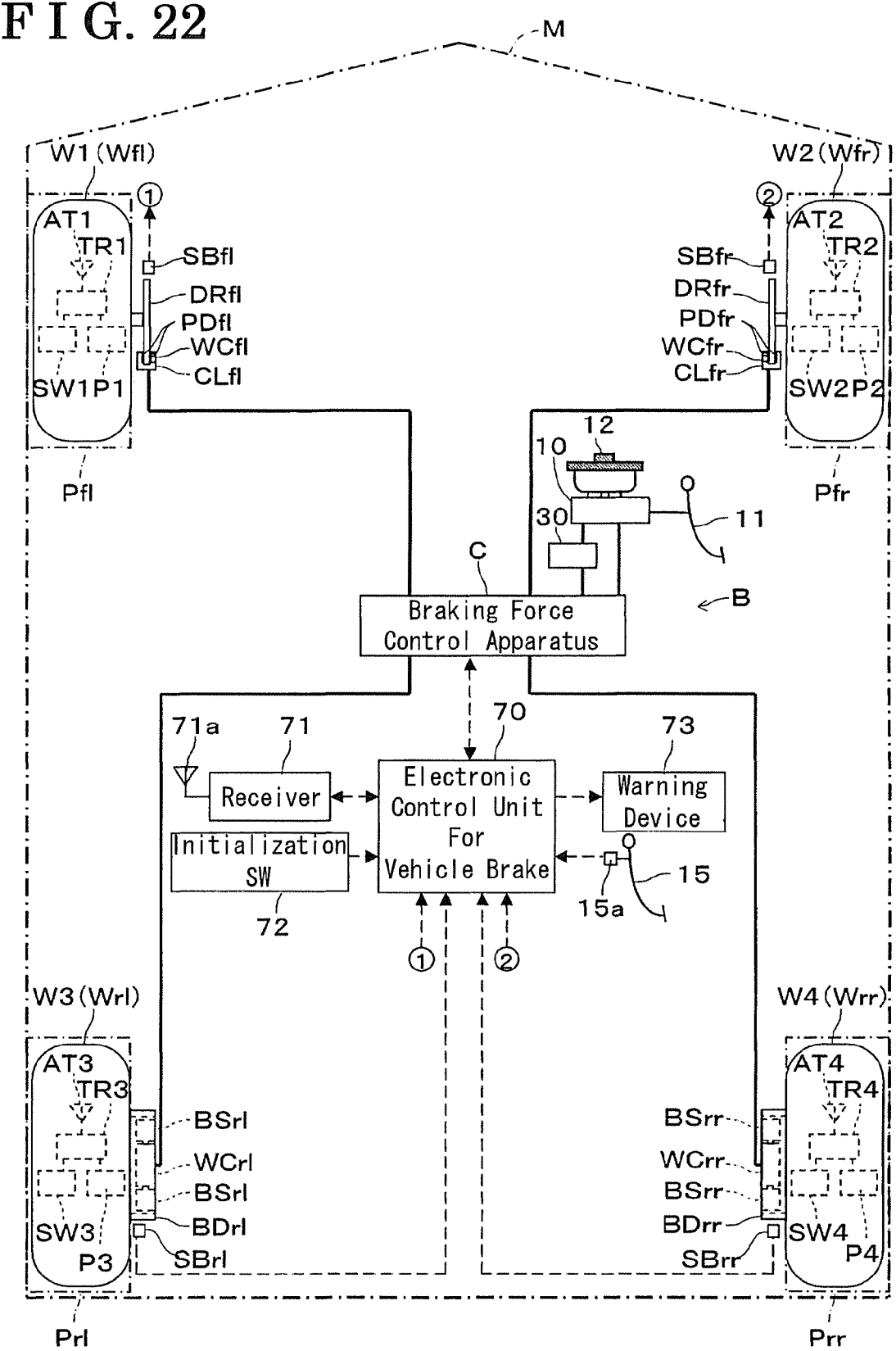
FIG. 22 is a view schematically illustrating a vehicle applied with a wheel position identifying apparatus according to a variation of the present invention.

According to the embodiment described above, the wheel position identification is initiated when the initialization SW 72 is turned on. Alternatively, the wheel position identification may be initiated when the controller 70 detects decreasing in a level of pneumatic pressure of the wheel based upon a level of pneumatic pressure obtained from a pneumatic sensor. In this case, as illustrated in FIG. 22, the wheel W1-W4s are each mounted with pneumatic sensors P1-P4 respectively, in addition to the rotation state sensors SW1-SW4. Each pneumatic sensor P1-P4 detects pneumatic pressure of each wheel W1-W4.

Figure 23:
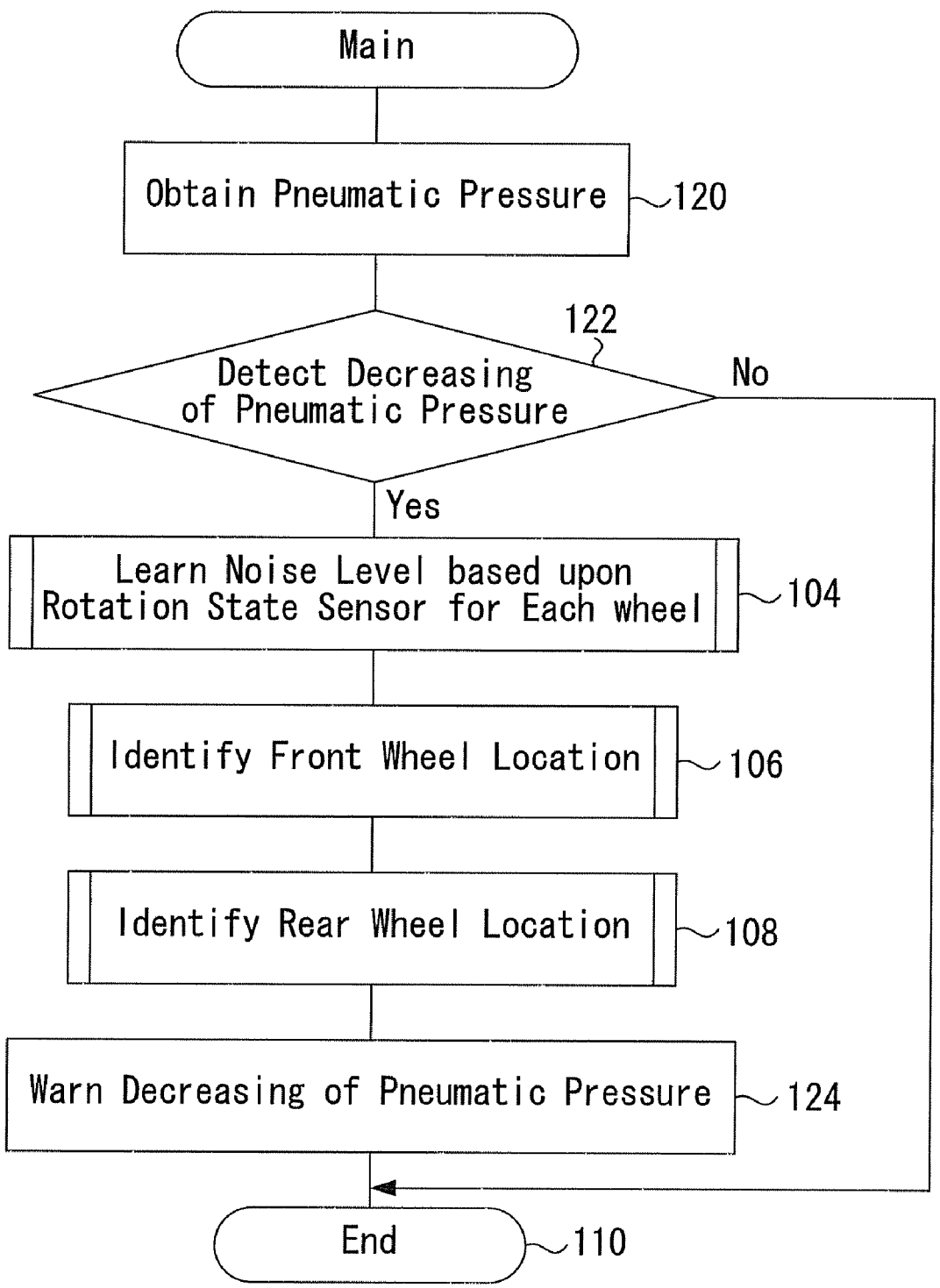
FIG. 23 is a flowchart for explaining a modified example of the main program implemented by a controller illustrated in FIG. 22.

The controller 70 implements a main program of the wheel position identifying control (processes) in FIG. 23 in substitution for the main program of the wheel position identifying control (processes) in FIG. 4. In step 120, the controller 70 obtains pneumatic pressure from each pneumatic sensor P1-P4. In step 122, the controller 70 judges a presence, or an absence, of decreasing in a level of pneumatic pressure of each wheel W1-W4 based upon the pneumatic pressure obtained in step 120 (initiating means). When the pneumatic pressure obtained is less than, or equal to, the judgment threshold value, the controller 70 determines the presence of decreasing in a level of pneumatic pressure. In other words, the controller 70 recognizes a requirement for identifying the wheel position of the wheel. Meanwhile, when the pneumatic pressure obtained is greater than the judgment threshold value, the controller 70 determines an absence of decreasing in a level of pneumatic pressure. In other words, the controller 70 recognizes no requirement for identifying the wheel position of the wheel.

When the controller 70 recognizes a presence of decreasing in a level of pneumatic pressure ("Yes" in step 122 (initiating means)), the program proceeds to step 104. In step 104, the controller 70 learns a level of noise of each wheel rotational speed fluctuation V1-V4. In step 106, the controller 70 identifies wheels placed at the front wheel positions. In step 108, the controller 70 identifies wheels placed at the rear wheel positions. In step 124, the controller 70 warns a driver of reduction in the pneumatic pressure with reference to the identified wheel position. On the other hand, when the controller 70 recognizes an absence of reduction in a level of pneumatic pressure ("No" in step 122), a process obtaining a negative answer "No" in step 122 is repeated until the pneumatic pressure decreases.

As described above, it is possible to automatically start the wheel position identification control by detecting decreasing in a level of pneumatic pressure of the wheel. Therefore, it is possible to reduce the frequency of implementing the wheel position identification control by implementing the wheel position identification appropriately when needed. Further, there is no need to provide the initialization SW 72, which is exclusive for starting the wheel position identification control, thereby reducing the manufacturing cost.

Further, if the rotation state sensor of only the wheel, of which pneumatic pressure decreases, outputs (transmits) the detection result and the wheel position of only the wheel is identified, it is possible to reduce the transmitting number of the sensors and to save energy consumed when transmitting. Further, as a method of reducing the transmitting number of the sensors, the sensor is allowed to transmit only when the vehicle M is miming at an arbitrary speed that is a control condition and/or only when a rotation angular speed is greater than, or equal to, a predetermined value, thereby saving energy consumed when transmitting.

According to the embodiment described above, the braking force-applying means is the wheel cylinder. However, the braking force-applying means is not limited only to the wheel cylinder and can be another component as far as applying braking force to the wheel. For example, the braking force-applying means can be represented by an electric motor. In this case, the electric motor is driven to push the pads of the disc brake or to expand the brake shoes of the drum brake, thereby generating braking force.

Therefore, it is possible to identify the wheel position of the wheel with reliability and in a short period of time based upon only detection result of the rotation state sensor provided at the wheel side. That is, there is no need to employ detection result of the wheel speed sensor provided at the vehicle body side, which have been conventionally employed.

The braking force fluctuation generating means controls the at least one of the braking force-applying means to generate the braking force fluctuation in a manner that an amount of braking force applied by the at least one of the braking force-applying means gradually increases at a predetermined increasing rate and reduces rapidly after reaching a predetermined braking force level.

Therefore, an amount of pressure is relatively smoothly increased, thereby preventing an occurrence of braking shock. Therefore, it is possible to identify the wheel position of the wheel by automatically applying braking force to the vehicle while restraining an occurrence of the possible uncomfortable feeling to a driver. In a drum brake, which does not respond well at a time of pressure increasing, a wheel rotational speed fluctuation may not readily arise from a W/C oil pressure fluctuation. However, it is possible to detect a wheel rotational speed fluctuation, which arises from a W/C oil pressure fluctuation created by a reduction in an amount of braking force due to a sudden reduction in oil pressure. Therefore, the wheel position of the wheel is identified reliably and accurately even when a drum brake is employed.

The braking force fluctuation generating means controls the at least one of the braking force-applying means to generate the braking force fluctuation so as to temporally reduce an amount of braking force applied by the at least one of the braking force-applying means while the braking force is being applied to the vehicle.

Therefore, it is possible to identify the wheel position of the wheel by automatically generating braking force fluctuation while restraining an uncomfortable feeling obtained by a driver while the braking force is being applied to the vehicle.

The braking force fluctuation generating means controls the at least one of the braking force-applying means separately to generate the braking force fluctuation. The associating means respectively associates the at least one of the braking force-applying means, which generates the braking force fluctuation, with the at least one of the wheels which responds to the braking force fluctuation.

Therefore, it is possible to identify the wheel position of the wheel one-by-one by an easy and short-duration control.

The wheels include a first wheel, a second wheel, a third wheel and a fourth wheel. The braking force-applying means include a first braking force-applying means, a second braking force-applying means, a third braking-force applying means and a fourth braking-force applying means. The first wheel and the first braking force-applying means are arranged at a front-left of the vehicle. The second wheel and the second braking force-applying means are arranged at a front-right of the vehicle. The third wheel and the third braking force-applying means are arranged at a rear-left of the vehicle. The fourth wheel and the fourth braking force-applying means are arranged at a rear-right of the vehicle. The braking force fluctuation generating means first controls any two braking force-applying means from among the four braking force applying means to simultaneously generate the braking force fluctuations and secondly controls one of the two braking force-applying means, which are first controlled to generate the braking force fluctuations, and one of the other two braking force-applying means, which are not first controlled to generate the braking force fluctuations, to simultaneously generate the braking force fluctuations. The associating means associates each wheel with each braking force-applying means respectively. The association is based upon a combination of the braking force applying means, which generates the braking force fluctuation, and the wheel that responds to the braking force fluctuation, and a combination of the braking force applying means, which does not generate the braking force fluctuation, and the wheel which does not respond to the braking force fluctuation. Each combination is defined in response to generation of the W/C oil pressure fluctuations first and secondly.

Mean while, when the four wheels are arranged at the four wheel-locations (front-left, front-right, rear-left, rear-right) for example, the braking force fluctuation is generated at the braking force-applying means one-by-one so as to identify the wheel location of the wheel one-by-one. In this case, the braking force fluctuation needs to be generated three times. However, according to the above-described control, for example, the front (or rear) two braking force-applying means are first controlled to generate the braking force fluctuations. Secondly the left (or right) two braking force-applying means are controlled to generate the braking force fluctuations. The wheel location of the wheel is identified based upon a combination of the first and second results. That is, it is possible to identify the wheel location of the wheel only by generating the braking force fluctuation twice. In this case, braking force fluctuates not every single wheel by every two wheels. Therefore, it is possible to identify the wheel location of the wheel in an abbreviated period of time while assuring a stability of the wheel.

The wheels include a first wheel, a second wheel, a third wheel and a fourth wheel. The braking force-applying means include a first braking force-applying means, a second braking force-applying means, a third braking-force applying means and a fourth braking-force applying means. The first wheel and the first braking force-applying means are arranged at a front-left of the vehicle. The second wheel and the second braking force-applying means are arranged at a front-right of the vehicle. The third wheel and the third braking force-applying means are arranged at a rear-left of the vehicle. The fourth wheel and the fourth braking force-applying means are arranged at a rear-right of the vehicle. The braking force fluctuation generating means controls any three braking force-applying means from among the four braking force applying means to simultaneously generate the braking force fluctuations. The associating means associates the braking force-applying means, which is not controlled to generate the braking force fluctuation, with the wheel, which does not respond to the braking force fluctuations.

Therefore, the braking force fluctuation is generated not at every single wheel nor at every two wheels but at every three wheels. Therefore, it is possible to identify the wheel position of the wheel while assuring a stability of the vehicle at an earlier stage.

The braking force fluctuation generating means controls the at least one of the braking force-applying means with a time deviation therebetween to generate the braking force fluctuation, which corresponds to an increase in an amount of braking force to be applied to the vehicle, when starting braking of the vehicle.

Therefore, a driver does not have to erroneously feel such increase in an amount of braking force for example when depressing the brake pedal, increasing a depressing amount of the brake pedal, or braking due to an engine brake. As a result, it is possible to identify the position of the wheel without uncomfortable feeling obtained by the driver.

The braking force fluctuation generating means controls the at least of one of the braking force-applying means with a time deviation therebetween to generate the braking force fluctuation, which corresponds to a reduction in an amount of braking force to be applied to the vehicle, when starting braking of the vehicle.

Accordingly, a driver does not have to erroneously feel such reduction in an amount of braking force for example when releasing a depressing operation against the brake pedal. As a result, it is possible to identify the position of the wheel without uncomfortable feeling obtained by the driver.

The wheel position identifying apparatus further includes: stopping means for stopping a series of the braking force fluctuation generating means, the response probability obtaining means and the associating means when the vehicle is running on a rough road.

Therefore, a response relative to the braking force fluctuation is prevented reliably from being obtained erroneously, thereby avoiding reliably an erroneous identification of the position of the wheel.

The response probability obtaining means includes judging means for judging a presence of a response relative to the braking force fluctuation when the wheel rotational speed fluctuation is greater than, or equal to a judgment threshold value, the wheel rotational speed fluctuation being derived from a fluctuated rotation of the wheel. Level learning means learns a level of the wheel rotational speed fluctuation and changing the judgment threshold value in response to a result of the learning.

Therefore, for example when a wheel is unbalanced due to aging, it is possible to reliably obtain a response relative to the braking force fluctuation, thereby reliably identifying a wheel position of the wheel.

The wheel position identifying apparatus further includes initiating means. The initiating means initiates a series of the braking force fluctuation generating means, the response probability obtaining means and the associating means when there is a presence of reduction in pneumatic pressure of the at least one of the braking force-applying means based upon pneumatic pressures detected by a plurality of pneumatic sensors for detecting respective pneumatic pressures of the respective wheels and mounted thereon.

Therefore, it is possible to automatically start the wheel position identification control by detecting decreasing in a level of pneumatic pressure of the wheel. Therefore, it is possible to reduce the frequency of implementing the wheel position identification control by implementing the wheel position identification appropriately when needed. Further, there is no need to provide the initialization, which is exclusive for starting the wheel position identification control, thereby reducing the manufacturing cost.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Fluctuations and changes may be made by others, and equivalents employed, without departing from the spirit of the present invention. Accordingly, it is expressly intended that all such fluctuations, changes and equivalents that fall within the spirit and scope of the present invention as defined in the claims, be embraced thereby.

The invention claimed is:

1. A wheel position identifying apparatus for a vehicle equipped with a plurality of braking force-applying means fixed at a body of the vehicle and preliminarily associated with wheel positions of wheels to be mounted on the vehicle, respectively, the apparatus identifying the wheel position of each wheel mounted on the vehicle and comprising:

braking force fluctuation generating means for controlling at least one of the braking force-applying means to generate a braking force fluctuation to at least one of the wheels independently;

response probability recognizing means for recognizing a presence, or an absence, of a response of the at least one of the wheels relative to the braking force fluctuation based upon a wheel rotational speed fluctuation of the at least one of the wheels, the wheel rotational speed fluctuation being obtained from a rotation state sensor mounted on each wheel; and associating means for associating the at least one of the wheels with the at least one of the braking force-applying means respectively based upon a combination of a presence, or an absence, of the braking force fluctuation at each braking force-applying means and the presence, or the absence, of the response recognized by the response probability recognizing means.

2. A wheel position identifying apparatus for a vehicle according to claim 1, wherein the braking force fluctuation generating means controls the at least one of the braking force-applying means to generate the braking force fluctuation in a manner that an amount of braking force applied by the at least one of the braking force-applying means gradually increases at a predetermined increasing rate and reduces rapidly after reaching a predetermined braking force level.

3. A wheel position identifying apparatus for a vehicle according to claim 2, wherein the braking force fluctuation generating means controls the at least one of the braking force-applying means with a time deviation therebetween to generate the braking force fluctuation, which corresponds to an increase in an amount of braking force to be applied to the vehicle, when starting braking of the vehicle.

4. A wheel position identifying apparatus for a vehicle according to claim 2, wherein the braking force fluctuation generating means controls the at least of one of the braking force-applying means with a time deviation therebetween to generate the braking force fluctuation, which corresponds to a reduction in an amount of braking force to be applied to the vehicle, when releasing braking of the vehicle.

5. A wheel position identifying apparatus for a vehicle according to claim 1,
wherein the wheels include a first wheel, a second wheel, a third wheel and a fourth wheel, the braking force-applying means include a first braking force-applying means, a second braking force-applying means, a third braking-force applying means and a fourth braking-force applying means, the first wheel and the first braking force-applying means are arranged at a front-left of the vehicle, the second wheel and the second braking force-applying means are arranged at a front-right of the vehicle, the third wheel and the third braking force-applying means are arranged at a rear-left of the vehicle, and the fourth wheel and the fourth braking force-applying means are arranged at a rear-right of the vehicle,
wherein the braking force fluctuation generating means first controls any two braking force-applying means from among the four braking force applying means to simultaneously generate the braking force fluctuations and secondly controls one of the two braking force-applying means, which are first controlled to generate the braking force fluctuations, and one of the other two braking force-applying means, which are not first controlled to generate the braking force fluctuations, to simultaneously generate the braking force fluctuations, and wherein the associating means associates each wheel with each braking force-applying means respectively based upon a combination of the braking force applying means, which generates the braking force fluctuation, and the wheel which responds to the braking force fluctuation, and a combination of the braking force applying means, which does not generate the braking force fluctuation, and the wheel which does not respond to the braking force fluctuation, each combination being defined in response to generation of the braking force fluctuations first and secondly.

6. A wheel position identifying apparatus for a vehicle according to claim 1, wherein the wheels include a first wheel, a second wheel, a third wheel and a fourth wheel, the braking force-applying means include a first braking force-applying means, a second braking force-applying means, a third braking-force applying means and a fourth braking-force applying means, the first wheel and the first braking force-applying means are arranged at a front-left of the vehicle, the second wheel and the second braking force-applying means are arranged at a front-right of the vehicle, the third wheel and the third braking force-applying means are arranged at a rear-left of the vehicle, and the fourth wheel and the fourth braking force-applying means are arranged at a rear-right of the vehicle,
wherein the braking force fluctuation generating means controls any three braking force-applying means from among the four braking force applying means to simultaneously generate the braking force fluctuations, and
wherein the associating means associates the braking force-applying means, which is not controlled to generate the braking force fluctuation, with the wheel, which does not respond to the braking force fluctuations.

7. A wheel position identifying apparatus for a vehicle according to claim 1, wherein the braking force fluctuation generating means controls the at least one of the braking force-applying means to generate the braking force fluctuation so as to temporally reduce an amount of braking force applied by the at least one of the braking force-applying means while the braking force is being applied to the vehicle.

8. A wheel position identifying apparatus for a vehicle according to claim 1, wherein the braking force fluctuation generating means controls the at least one of the braking force-applying means with a time deviation to generate the braking force fluctuation, and the associating means respectively associates the at least one of the braking force-applying means, which generates the braking force fluctuation, with the at least one of the wheels which responds to the braking force fluctuation.

9. A wheel position identifying apparatus for a vehicle according to claim 1, further comprising:
stopping means for stopping a series of the braking force fluctuation generating means, the response probability recognizing means and the associating means when the vehicle is running on a rough road.

10. A wheel position identifying apparatus for a vehicle according to claim 1, further comprising:
the response probability recognizing means including:
judging means for judging a presence of a response relative to the braking force fluctuation when the wheel rotational speed fluctuation is greater than, or equal to a judgment threshold value, the wheel rotational speed fluctuation being derived from a fluctuated rotation of the wheel; and
level learning means for learning a level of the wheel rotational speed fluctuation and changing the judgment threshold value in response to a result of the learning.

11. A wheel position identifying apparatus for a vehicle according to claim 1, further comprising:
    initiating means for initiating a series of the braking force fluctuation generating means, the response probability recognizing means and the associating means when there is a presence of reduction in pneumatic pressure of the at least one of the braking force-applying means based upon pneumatic pressures detected by a plurality of pneumatic sensors for detecting respective pneumatic pressures of the respective wheels and mounted thereon.

* * * * *